US010574897B2

(12) United States Patent
Ozawa et al.

(10) Patent No.: US 10,574,897 B2
(45) Date of Patent: Feb. 25, 2020

(54) DISPLAY SYSTEM, DISPLAY DEVICE, AND CONTROL METHOD FOR DISPLAY DEVICE

(71) Applicant: SEIKO EPSON CORPORATION, Tokyo (JP)

(72) Inventors: Emi Ozawa, Azumino (JP); Shinichi Kobayashi, Azumino (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 67 days.

(21) Appl. No.: 15/895,214

(22) Filed: Feb. 13, 2018

(65) Prior Publication Data
US 2018/0249085 A1 Aug. 30, 2018

(30) Foreign Application Priority Data

Feb. 27, 2017 (JP) .................. 2017-034319

(51) Int. Cl.
*H04N 5/232* (2006.01)
*H04N 5/445* (2011.01)
(Continued)

(52) U.S. Cl.
CPC ....... *H04N 5/23293* (2013.01); *G02B 27/017* (2013.01); *G02B 27/0172* (2013.01);
(Continued)

(58) Field of Classification Search
CPC ........... H04N 5/23293; H04N 5/23216; H04N 5/445; H04N 7/181; H04N 13/296; H04N 13/243; H04N 13/239; H04N 13/344; H04N 13/383; G09G 3/001; G09G 2370/06; G06F 3/147; G05D 1/0038; G05D 1/102; G02B 27/0172; G02B 2027/0138; G02B 2027/0178; G02B 2027/014; G02B 6/0088
(Continued)

(56) References Cited

U.S. PATENT DOCUMENTS

2013/0038692 A1  2/2013  Ohtomo et al.
2013/0082993 A1*  4/2013  Kim .................. G09G 5/10
                                               345/207
(Continued)

FOREIGN PATENT DOCUMENTS

JP    2013-038622 A    2/2013
JP    2013-144539 A    7/2013
JP    2016-010145 A    1/2016

*Primary Examiner* — Allen C Wong
(74) *Attorney, Agent, or Firm* — Oliff PLC

(57) ABSTRACT

An HMD includes a display section configured to display an image to enable visual recognition of an outside scene by transmitting external light, an operation detecting section configured to detect operation, a HMD control section configured to generate, according to the operation detected by the operation detecting section, a command for operating a first mobile body, a communication control section configured to acquire first mobile body image data concerning a captured image captured by the mobile body, and a display control section configured to cause the display section to display an image based on the first mobile body image data acquired by the communication control section. The display control section controls visibility of the outside scene in the display section.

18 Claims, 14 Drawing Sheets

(51) Int. Cl.
*G06F 3/147* (2006.01)
*G05D 1/00* (2006.01)
*G02B 27/01* (2006.01)
*G09G 3/00* (2006.01)
*H04N 13/383* (2018.01)
*H04N 13/243* (2018.01)
*H04N 7/18* (2006.01)
*H04N 13/296* (2018.01)
*H04N 13/239* (2018.01)
*H04N 13/344* (2018.01)
*F21V 8/00* (2006.01)
*G05D 1/10* (2006.01)

(52) U.S. Cl.
CPC ........... *G05D 1/0038* (2013.01); *G06F 3/147* (2013.01); *G09G 3/001* (2013.01); *H04N 5/23216* (2013.01); *H04N 5/445* (2013.01); *H04N 7/181* (2013.01); *H04N 13/239* (2018.05); *H04N 13/243* (2018.05); *H04N 13/296* (2018.05); *H04N 13/344* (2018.05); *H04N 13/383* (2018.05); *G02B 6/0088* (2013.01); *G02B 2027/014* (2013.01); *G02B 2027/0118* (2013.01); *G02B 2027/0138* (2013.01); *G02B 2027/0178* (2013.01); *G02B 2027/0187* (2013.01); *G05D 1/102* (2013.01); *G09G 2370/06* (2013.01)

(58) Field of Classification Search
USPC ......................................................... 348/114
See application file for complete search history.

(56) References Cited

U.S. PATENT DOCUMENTS

| | | | |
|---|---|---|---|
| 2013/0173088 A1* | 7/2013 | Callou | B64C 39/024 701/2 |
| 2016/0349849 A1* | 12/2016 | Kwon | G06F 3/011 |
| 2017/0026680 A1 | 1/2017 | Sugio et al. | |
| 2018/0040298 A1* | 2/2018 | Chu | G09G 3/3406 |

* cited by examiner

DISPLAY SYSTEM, DISPLAY DEVICE, AND CONTROL METHOD FOR DISPLAY DEVICE

BACKGROUND

1. Technical Field

The present invention relates to a display system, a display device, and a control method for the display device.

2. Related Art

There has been known an unmanned aircraft (a so-called Drone) that can be remotely piloted (see, for example, JP-A-2013-144539 (Patent Literature 1)). The unmanned aircraft described in Patent Literature 1 is a quadricopter including a navigation posture control system. The unmanned aircraft receives a piloting command through a wireless link between the unmanned aircraft and a remote control device. The unmanned aircraft described in Patent Literature 1 includes a camera and transmits an image captured by a camera to the remote control device. A user can perform operation such as a turn and raising or lowering of the unmanned aircraft and a change of a direction pointed by the camera.

As described in Patent Literature 1, when the camera is provided in the unmanned aircraft to cause the camera to perform imaging, it is conceivable to appropriately display a captured image. Therefore, there has been a demand for a technique for displaying the image captured by the unmanned aircraft using a method with high usefulness.

SUMMARY

An advantage of some aspects of the invention is to provide a display system, a display device, and a control method for the display device capable of effectively displaying an image captured by a mobile body having an imaging function.

A display system according to an aspect of the invention includes a first display device and a second display device. The first display device includes: a first display section; a first operation detecting section configured to detect operation; a first mobile-body control section configured to generate, according to the operation detected by the first operation detecting section, a command for operating a first mobile body; a first mobile-body-image-data acquiring section configured to acquire first mobile body image data concerning a captured image captured by the first mobile body; and a first display control section configured to cause the first display section to display an image based on the first mobile body image data acquired by the first mobile-body-image-data acquiring section. The second display device includes: a second display section; a second mobile-body-image-data acquiring section configured to acquire the first mobile body image data concerning the captured image captured by the first mobile body; and a second display control section configured to cause the second display section to display an image based on the first mobile body image data acquired by the second mobile-body-image-data acquiring section.

According to the aspect of the invention, since the display device generates the command for operating the first mobile body, it is possible to use, for operation of the first mobile body, the display device that displays an image concerning the captured image captured by the first mobile body. Therefore, it is possible to perform the operation of the first mobile body while viewing the image displayed by the display device. Since it is possible to display, with the second display device, the image concerning the captured image captured by the first mobile body, for example, a person not involved in the operation of the first mobile body can confirm the captured image of the first mobile body.

In the configuration described above, the first display section may display the image to enable visual recognition of an outside scene by transmitting external light, and the first display control section may control visibility of the outside scene in the first display section.

According to this configuration, the first display device displays, on the first display section that enables the visual recognition of the outside scene, the image concerning the captured image captured by the first mobile body. Consequently, it is possible to visually recognize the first mobile body in a real space, perform operation concerning a motion of the first mobile body, and visually recognize the image concerning the captured image. Therefore, it is possible to confirm the captured image and perform the operation of the first mobile body while viewing the first mobile body in the real space. Since the visibility of the outside scene in the display section can be controlled, for example, it is possible to prioritize the visibility of the first mobile body in the real space over the visibility of the captured image and control the display to facilitate the operation of the first mobile body.

In the configuration described above, the first display control section may cause the display section to display a screen for operation concerning processing for generating the command and control the visibility of the outside scene in the first display section according to a display state of the screen for operation.

According to this configuration, since it is possible to control the visibility of the outside scene according to the display state of the screen for operation concerning the motion of the first mobile body, for example, it is possible to adjust the visibility of the screen for operation and the visibility of the first mobile body in the real space. Therefore, it is possible to improve easiness of the operation of the first mobile body.

In the configuration described above, the first display control section may control the visibility of the outside scene in the first display section according to a display state of the image based on the first mobile body image data.

According to this configuration, since the visibility of the outside scene is controlled according to the display state concerning the captured image of the first mobile body, for example, it is possible to adjust the visibility of the first mobile body in the real space and the visibility of the image concerning the captured image. It is possible to achieve further improvement of convenience.

In the configuration described above, the first display control section may control the visibility of the outside scene in the first display section on the basis of a state of the first display section or a user who uses the first display section.

According to this configuration, since the visibility of the outside scene in the first display section is controlled on the basis of the state of the first display section or the user who uses the first display section, it is possible to control the visibility of the outside scene according to importance of the visibility of the outside scene for the user reflected on the position, the movement, the posture, and the like of the first display section or the user.

In the configuration described above, the first display control section may cause the first display section to display an image corresponding to an operation state of the first mobile body.

According to this configuration, it is possible to obtain information concerning the operation state of the first mobile body according to the display of the first display section. It is possible to achieve improvement of convenience concerning use of the captured image of the first mobile body.

In the configuration described above, the second display section may display the image to enable visual recognition of an outside scene by transmitting external light, and the second display control section may control visibility of the outside scene in the second display section.

According to this configuration, in the second display device, it is possible to visually recognize the outside scene and an image concerning the captured image captured by the first mobile body. It is possible to control the visibility of the outside scene.

In the configuration described above, the second display control section may control the visibility of the outside scene in the second display section on the basis of a state of the second display section or a user who uses the second display section.

According to this configuration, since the visibility of the outside scene in the first display section is controlled on the basis of the state of the second display section or the user who uses the second display section, it is possible to control the visibility of the outside scene according to importance of the visibility of the outside scene for the user reflected on the position, the movement, the posture, and the like of the second display section or the user.

In the configuration described above, the second display device may further include: a second operation detecting section configured to detect operation; and a second mobile-body control section configured to generate, according to the operation detected by the second operation detecting section, a command for operating a second mobile body, and the second display control section may cause the display section to display a screen for operation concerning processing for generating the command and control the visibility of the outside scene in the second display section according to a display state of the screen for operation.

According to this configuration, the first display device generates the command concerning the operation of the first mobile body and the second display device generates the command concerning the operation of the second mobile body. Therefore, a user who uses the first display device and a user who uses the second display device can respectively perform operation concerning motions of the mobile bodies while visually recognizing the mobile bodies in the real space and visually recognize images concerning captured images captured by the mobile bodies. Consequently, it is possible to provide the display system capable of easily performing the operation of the mobile bodies and use of the captured images captured by the mobile bodies.

In the configuration described above, the second mobile-body-image-data acquiring section included in the second display device may acquire second mobile body image data concerning a captured image captured by the second mobile body, and the second display control section may display, on the second display section, an image based on the first mobile body image data acquired by the second mobile-body-image-data acquiring section and an image based on the second mobile body image data acquired by the second mobile-body-image-data acquiring section.

According to this configuration, it is possible to display, with the second display device, the images concerning the captured images respectively captured by the first mobile body and the second mobile body.

In the configuration described above, the second display control section may control the visibility of the outside scene in the second display section according to a display state of at least either one of the image based on the first mobile body image data acquired by the second mobile-body-image-data acquiring section and the image based on the second mobile body image data acquired by the second mobile-body-image-data acquiring section.

According to this configuration, it is possible to control the visibility of the outside scene in displaying the captured images of the first mobile body and/or the second mobile body. Therefore, since it is possible to adjust a balance of the visibilities of the outside scene and the captured images of the first mobile body and/or the second mobile body, for example, when the user of the second display device operates the second display device, it is possible to prioritize the visibility of the second mobile body in the real space and improve operability.

In the configuration described above, the second display control section may cause the second display section to display an image corresponding to an operation state of the second mobile body.

According to this configuration, it is possible to perform display concerning the operation state of the second mobile body in the second display device. It is possible to further facilitate the operation concerning the motion of the second mobile body and improve the operability.

In the configuration described above, the second display control section may cause the second display section to display images corresponding to an operation state of the first mobile body and an operation state of the second mobile body.

According to this configuration, it is possible to perform the display concerning the operation states of the first mobile body and the second mobile body in the second display device. Consequently, it is possible to perform operation concerning the motion of the second mobile body while confirming a state of the first mobile body.

In the configuration described above, the second display control section may cause the second display section to display an image corresponding to an operation state of the second mobile body in a position corresponding to the second mobile body visually recognized in the outside scene via the second display section.

According to this configuration, it is possible to cause the second display section to display, according to a position where the second mobile body in the real space is visually recognized, an image displayed by the second display section concerning the operation state of the second mobile body. Therefore, it is possible to further facilitate the operation concerning the motion of the second mobile body and improve the operability.

In the configuration described above, the second display device may further include a position-information acquiring section configured to acquire information concerning a position of the first mobile body and a position of the second mobile body, and the second display control section may cause the second display section to display the information acquired by the position-information acquiring section.

According to this configuration, it is possible to perform display concerning the positions of the first mobile body and the second mobile body in the second display device.

In the configuration described above, the second mobile-body control section included in the second display device may generate, on the basis of the information acquired by the position-information acquiring section, the command for operating the second mobile body.

According to this configuration, it is possible to operate the second mobile body with the second display device according to the positions of the first mobile body and the second mobile body.

In the configuration described above, at least either one of the first display section and the second display section may be a head-mounted display section mounted on a head of a user.

According to this configuration, with the display device including the head-mounted display section, it is possible to, while visually recognizing the first mobile body or the second mobile body in the real space, perform operation concerning a motion of the mobile body and further view an image concerning a captured image captured by the mobile body.

A display device according another aspect of the invention includes: a display section configured to display an image to enable visual recognition of an outside scene by transmitting external light; an operation detecting section configured to detect operation; a mobile-body control section configured to generate, according to the operation detected by the operation detecting section, a command for operating a first mobile body; a mobile-body-image-data acquiring section configured to acquire first mobile body image data concerning a captured image captured by the first mobile body; and a display control section configured to cause the display section to display an image based on the first mobile body image data acquired by the mobile-body-image-data acquiring section. The display control section controls visibility of the outside scene in the display section.

According to the aspect of the invention, since an image concerning the captured image captured by the first mobile body is displayed on the display section that enables the visual recognition of the outside scene, it is possible to view the image concerning the captured image while visually recognizing the first mobile body in a real space. Since it is possible to visually recognize the first mobile body in the real space and perform operation while viewing the captured image, it is possible to easily perform both of confirmation of the captured image and the operation of the mobile body. Since it is possible to control the visibility of the outside scene in the display section, for example, it is possible to prioritize the visibility of the first mobile body in the real space over the visibility of the captured image and control display to facilitate the operation of the first mobile body.

In the configuration described above, the mobile-body-image-data acquiring section may acquire second mobile body image data concerning a captured image captured by a second mobile body, and the display control section may cause the display section to display an image based on at least either one of the first mobile body image data and the second mobile body image data acquired by the mobile-body-image-data acquiring section and control visibility of the outside scene in the display section according to a display state of at least either one of an image based on the first mobile body image data and an image based on the second mobile body image data.

According to this configuration, since it is possible to control the visibility of the outside scene, for example, it is possible to display images related to the captured image of the first mobile body and/or the captured image of the second mobile body and adjust the visibilities of the images and the outside scent. Consequently, it is possible to efficiently use the captured images captured by the mobile bodies.

A control method for a display device according to still another aspect of the invention includes a display section configured to display an image to enable visual recognition of an outside scene by transmitting external light, the control method including: detecting operation; generating, according to the detected operation, a command for operating a mobile body; acquiring mobile body image data concerning a captured image captured by the mobile body; and causing the display section to display an image based on the acquired mobile body image data and controlling visibility of the outside scene in the display section.

According to the aspect of the invention, since an image concerning the captured image captured by the mobile body is displayed on the display section that enables the visual recognition of the outside scene, it is possible to view the image concerning the captured image while visually recognizing the mobile body in a real space. Since it is possible to visually recognize the mobile body in the real space and perform operation while viewing the captured image, it is possible to easily perform both of confirmation of the captured image and the operation of the mobile body. Since it is possible to control the visibility of the outside scene in the display section, for example, it is possible to prioritize the visibility of the mobile body in the real space over the visibility of the captured image and control display to facilitate the operation of the mobile body.

It is possible to realize the invention in various forms other than the display system, the display device, and the control method for the display device explained above. For example, the display system may be a system including the display device and the first mobile body and/or the second mobile body. The invention may be realized as a computer program executed by a control section or a computer in order to execute the control method. The invention can be realized in forms such as a recording medium having the computer program recorded therein, a server apparatus that distributers the computer program, a transmission medium that transmits the computer program, and a data signal obtained by embodying the computer program in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
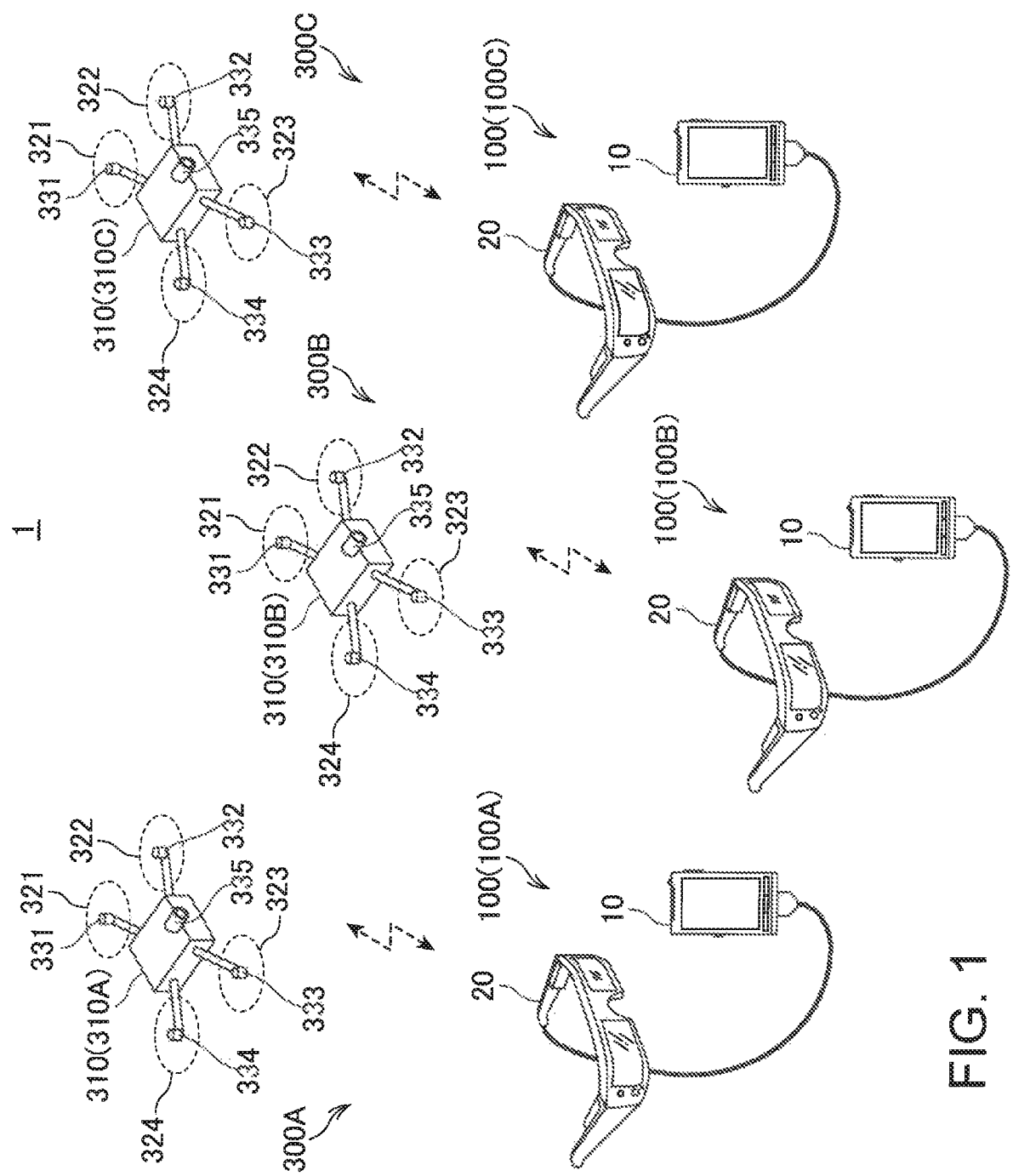
FIG. 1 is a schematic configuration diagram of a mobile machine composite control system.

FIG. 1 is a schematic configuration diagram of a mobile machine composite control system 1 according to an embodiment applied with the invention.

The mobile machine composite control system 1 (a display system) is a display system configured by a mobile machine control system 300 including a mobile machine (a mobile body) 310 and an HMD (Head Mounted Display: a head-mounted display device) 100 worn and used by an operator who pilots the mobile machine 310. In the mobile machine composite control system 1, a plurality of operators respectively wear HMDs 100 (display devices) and pilot mobile machines 310. The mobile machine composite control system 1 includes a plurality of mobile machine control systems 300.

In an example shown in FIG. 1, the mobile machine composite control system 1 is configured by three mobile machine control systems 300A, 300B, and 300C. The number of mobile machine control systems 300 configuring the mobile machine composite control system 1, that is, the number of HMDs 100 and the number of mobile machines 310 are optional and may be two or less or may be four or more. The mobile machine composite control system 1 may include the HMD 100 worn by an operator who does not pilot the mobile machine 310.

In the following explanation, a plurality of HMDs 100 and a plurality of mobile machines 310 are distinguished by signs and described as HMD 100A, 110B, and 100C and mobile machines 310A, 310B, and 310C. When it is necessary to distinguish the respective HMDs 100, the HMDs 100 are described as HMDs 100A, 100B, and 100C. When the HMDs 100 are not distinguished, the HMDs 100 are described as HMD 100. Similarly, when it is necessary to distinguish the respective mobile machines 310, the mobile machines 310 are described as mobile machines 310A, 310B, and 310C. When the mobile machines 310 are not distinguished, the mobile machines 310 are described as mobile machine 310.

Although not shown in the figure, the mobile machine 310A is piloted by an operator A, the mobile machine 310B is piloted by an operator B, and the mobile machine 310C is piloted by an operator C. The operator can be called user. In the following explanation, the operator is referred to as user.

In this embodiment, the mobile machine 310 is illustrated as a form of the mobile body according to the invention. The mobile machine 310 is an aerial vehicle that flies according to rotation of four propellers 321, 322, 323, and 324. Alternatively, the mobile machine 310 is a type of a so-called Drone that means an unmanned aerial vehicle (UAV) and can also be called quadricopter. The mobile machine 310 is remotely piloted by the HMD 100. That is, the mobile machine 310A is remotely piloted by the HMD 100A. Similarly, the mobile machine 310B is piloted by the HMD 100B and the mobile machine 310C is piloted by the HMD 100C.

The propellers 321, 322, 323, and 324 are respectively driven by flight motors 331, 332, 333, and 334 to rotate and lift the mobile machine 310. A mobile machine camera 335 is provided in the mobile machine 310. The mobile machine 310 can transmit a captured image captured by the mobile machine camera 335 to the HMD 100. The mobile machine camera 335 may be directly fixed to a main body of the mobile machine 310 or may be fixed to the main body of the mobile machine 310 via a pedestal such as a Gimbal or a platform. A mechanism for changing and adjusting an imaging direction of the mobile machine camera 335 may be provided in the pedestal of the mobile machine camera 335.

The HMD 100 is a display device including an image display section 20 (a display section) that causes the user to visually recognize a virtual image in a state in which the image display section 20 is worn on the head of the user and a control device 10 that controls the image display section 20. As explained below with reference to FIG. 3, the control device 10 includes a main body having a flat box shape. The control device 10 includes, in the main body, operation sections such as various switches and an operation pad that receive operation by the user. The user operates the operation sections, whereby the control device 10 functions as a control device that controls the HMD 100.

The HMD 100 executes communication between the HMD 100 and the mobile machine 310. The HMD 100 receives the image data from the mobile machine 310 and displays, with the image display section 20, an image based on the received image data. Consequently, the user can visually recognize, with the image display section 20, a captured image captured by the mobile machine 310, operate the control device 10, and pilot the mobile machine 310.

A form of connecting the HMD 100 and the mobile machine 310 is optional. For example, the control device 10 and the mobile machine 310 transmit and receive various data using radio signals having frequencies explained below.

Figure 2:
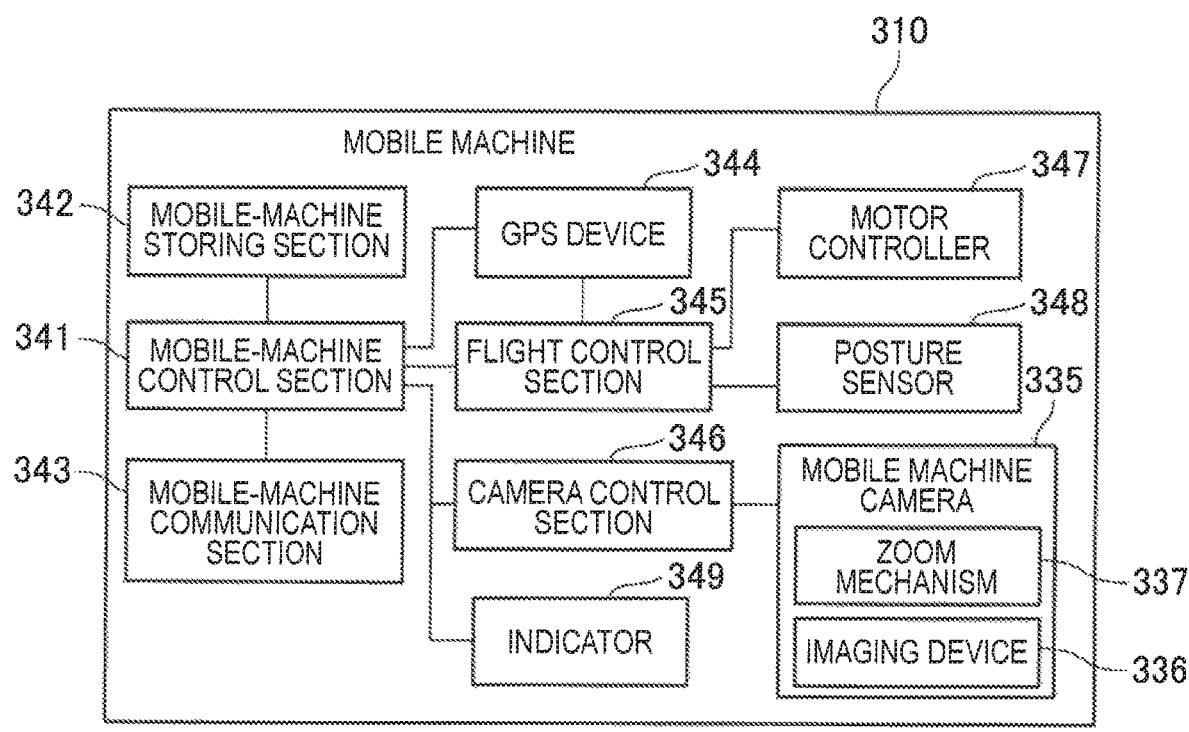
FIG. 2 is a functional block diagram of a mobile machine.

FIG. 2 is functional block diagram of the mobile machine 310. The configuration of a control system of the mobile machine 310 is shown. The configuration is common to the mobile machines 310A, 310B, and 310C. Therefore, the mobile machines 310A, 310B, and 310C are explained without being distinguished.

The control system of the mobile machine 310 is configured by a mobile-machine control section 341 that controls the mobile machine 310 and sections connected to the mobile-machine control section 341. Specifically, the mobile machine 310 includes the mobile-machine control section 341, a mobile-machine storing section 342, a mobile-machine communication section 343, a GPS device 344, a flight control section 345, a camera control section 346, a motor controller 347, a posture sensor 348 and indicator 349. Although not shown in the figure, the mobile machine 310 includes a battery that supplies electric power to sections including the flight motors 331, 332, 333, and 334 (FIG. 1) and a battery control circuit that controls the power supply by the battery.

The mobile-machine control section 341 includes an arithmetic processing device (a processor) such as a CPU (Central Processing Unit) or a microcomputer. The mobile-machine control section 341 controls the mobile machine 310 by executing a computer program. The mobile-machine control section 341 may include a ROM (Read Only Memory), a RAM (Random Access Memory), and other peripheral circuits.

The mobile-machine storing section 342 that stores data and the like processed by the mobile-machine control section 341 is connected to the mobile-machine control section 341. The mobile-machine storing section 342 includes a storage device such as a semiconductor memory element and stores various data concerning the control of the mobile machine 310 and computer programs executed by the mobile-machine control section 341.

The mobile-machine communication section 343 is connected to the mobile-machine control section 341. The mobile-machine communication section 343 includes an antenna, an RF circuit, a baseband circuit, and a communication control circuit. Alternatively, the mobile-machine communication section 343 is configured by a device obtained by integrating the antenna, the RF circuit, the baseband circuit, the communication control circuit, and the like. The mobile-machine communication section 343 executes wireless communication between the mobile-machine communication section 343 and the HMD 100. The mobile-machine communication section 343 executes the wireless communication in a 27 MHz band, a 40 MHz band, a 2.4 GHz band, and the like, which are frequencies for radio control. Alternatively, the mobile-machine communication section 343 performs wireless communication conforming to standards such as a Bluetooth (registered trademark) and a wireless LAN (including Wi-Fi (registered trademark)). The mobile-machine communication section 343 executes communication with the HMD 100 according to the control by the mobile-machine control section 341, receives a command transmitted by the HMD 100, and outputs the command to the mobile-machine control section 341. The mobile-machine communication section 343 transmits captured image data of the mobile machine camera 335 to the HMD 100.

The mobile-machine communication section 343 included in the mobile machine 310A performs communication with the HMD 100A. Similarly, the mobile-machine communication section 343 of the mobile machine 310B communicates with the HMD 100B. The mobile-machine communication section 343 of the mobile machine 310C communicates with the HMD 100C.

The GPS (Global Positioning System) device 344 is a device that measures (positions) the position of the mobile machine 310 by receiving and analyzing signals transmitted from GPS satellites. The GPS device 344 performs the positioning according to the control by the mobile-machine control section 341 and outputs a positioning result to the mobile-machine control section 341. The positioning result output by the GPS device 344 includes the latitude and the longitude of the mobile machine 310 and may include the altitude of the mobile machine 310.

The flight control section 345 is connected to the mobile-machine control section 341. The flight control section 345 is connected to the motor controller 347 and the posture sensor 348. The motor controller 347 is a circuit that drives the flight motors 331, 332, 333, and 334 according to the control by the flight control section 345.

The posture sensor 348 is a sensor that detects the posture and the movement of the mobile machine 310. For example, the posture sensor 348 can include any one of a gyro sensor, an acceleration sensor, a speed sensor, and an altitude sensor. The posture sensor 348 may include a terrestrial magnetism sensor for detecting the direction of the mobile machine 310. For example, as the posture sensor 348, a nine-axis motion sensor unit obtained by integrating a three-axis gyro sensor, a three-axis acceleration sensor, and a three-axis terrestrial magnetism sensor may be used. The altitude sensor may be integrated in the motion sensor unit. The posture sensor 348 outputs a detection value to the flight control section 345 according to the control by the flight control section 345. The posture sensor 348 may include a wind velocity sensor.

The flight control section 345 outputs, to the mobile-machine control section 341, the detection value detected by the mobile machine 310 with the posture sensor 348 and/or the latitude and the longitude detected by the mobile machine 310 with the GPS device 344. The mobile-machine control section 341 can transmit a part or all of detection values of the posture sensor 348 and detection results of the GPS device 344 to the HMD 100 with the mobile-machine communication section 343. Information concerning the position of the mobile machine 310 transmitted to the HMD 100 by the mobile machine 310 is referred to as mobile machine position information. The mobile machine position information includes, for example, the altitude, the latitude, and the longitude of the mobile machine 310 and may include information concerning an external environment such as wind velocity. The mobile machine position information may include information other than the altitude, the latitude, and the longitude as information indicating the position of the mobile machine 310. For example, the position of the mobile machine 310 may be represented by an address indication, a place name, or a lot number corresponding to a plane position of the mobile machine 310 or a facility name or a building name in the vicinity of or immediately below the mobile machine 310. The mobile machine position information may include information indicating the position of the mobile machine 310 with a direction and a distance based on a preset landmark. The mobile machine position information may include information concerning an external environment such as wind velocity.

The information concerning the position of the mobile machine 310 transmitted to the HMD 100 by the mobile machine 310 may include, besides the mobile machine position information, mobile machine state information concerning an environment and a state of the mobile machine 310. The mobile machine state information may include information related to the position of the mobile machine 310. For example, the mobile machine state information may include information concerning a peripheral facility such as a facility name or a building name in the vicinity of or immediately below the mobile machine 310. The mobile machine state information may include information concerning the environment (weather, temperature, humidity, wind velocity, wind direction, precipitation, etc.) of the mobile machine 310.

The mobile machine 310 may transmit mobile machine position information based on a detection value and/or a detection result acquired at timing designated by the HMD 100 to the HMD 100. The mobile machine 310 may transmit, at any time, mobile machine position information based on a detection value and/or a detection result acquired after the timing designated by the HMD 100 to the HMD 100.

Note that a component with which the mobile machine 310 detects a position is not limited to the GPS device 344 and the posture sensor 348. For example, the mobile machine 310 may receive a beacon signal from a wireless beacon transmitter set in advance in an area where the mobile machine 310 flies and detect the position of the mobile machine 310 on the basis of reception intensity and the like of the beacon signal. As the wireless beacon transmitter, an optical beacon device that transmits a beacon signal with light outside a visible region such as infrared light (IR) or a Bluetooth beacon that transmits a beacon signal with the Bluetooth can be used. The position of the mobile machine 310 detected in this case includes an altitude and a relative position with respect to the wireless beacon transmitter. In this case, the mobile-machine control section 341 only has to generate mobile machine position information including the altitude and the relative position with respect to the wireless beacon transmitter and transmit the mobile machine position information to the HMD 100.

The camera control section 346 that controls the flight control section 345 is connected to the mobile-machine control section 341. The flight control section 345 is set in the main body of the mobile machine 310 as explained above and images a predetermined direction. The flight control section 345 includes an imaging device 336 and a zoom mechanism 337 that moves an imaging lens (not shown in the figure) to adjust a zoom magnification. The imaging device 336 includes, for example, a CCD (Charge Coupled Device) image sensor or a CMOS (Complementary Metal Oxide Semiconductor) image sensor.

The camera control section 346 drives the imaging device 336 and the zoom mechanism 337 according to the control by the mobile-machine control section 341, performs imaging at a zoom magnification designated by the mobile-machine control section 341, and outputs captured image data to the mobile-machine control section 341. The mobile machine 310 executes imaging with the mobile machine camera 335 at a preset sampling cycle and generates captured image data. That is, the mobile machine 310 is considered to capture a moving image. The mobile machine 310 can transmit captured image data captured at timing designated by the HMD 100 to the HMD 100. In this case, the HMD 100 can acquire captured image data of a still image captured by the mobile machine 310. The mobile machine 310 can transmit, at any time, captured image data captured after the timing designated by the HMD 100 to the HMD 100. In this case, the HMD 100 can acquire captured image data of a moving image (a video) captured by the mobile machine 310.

When transmitting the captured image data of the mobile machine camera 335, the mobile-machine control section 341 may transmit image data generated on the basis of the captured image data. For example, the mobile-machine control section 341 may change resolution and a frame rate of the captured image data of the mobile machine camera 335 to adjust a band and transmit adjusted image data.

An indicator 349 is connected to the mobile-machine control section 341. The indicator 349 includes a light source such as an LED (Light Emitting Diode) and emits light in a light emission color and/or a light emission pattern corresponding to an operation state of the mobile machine 310. The indicator 349 is disposed in a position visually recognizable from the outside during the flight of the mobile machine 310 such as the lower surface, the front surface, or the rear surface of a housing of the mobile machine 310. The mobile-machine control section 341 causes the indicator 349 to emit light according to an operation state of the flight control section 345. For example, the mobile-machine control section 341 causes the indicator 349 to emit light in red when the mobile machine 310 advances and causes the indicator 349 to emit light in green while the mobile machine 310 retracts. The mobile-machine control section 341 may flash the indicator 349 during a turn of the mobile machine 310.

Figure 3:
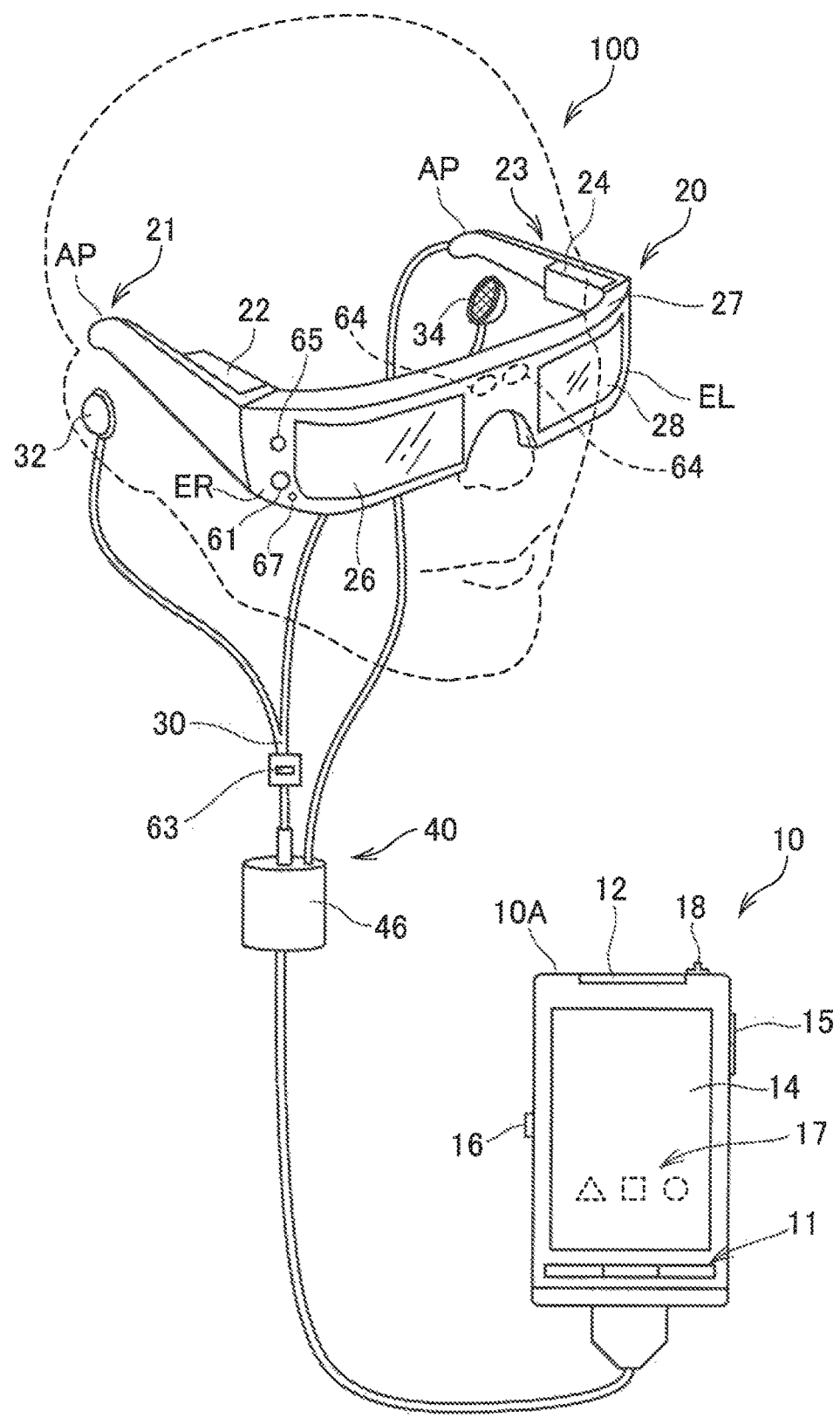
FIG. 3 is an explanatory diagram showing an exterior configuration of an HMD.

FIG. 3 is an explanatory diagram showing an exterior configuration of the HMD 100. This configuration is common to the HMDs 100A, 100B, and 100C. Therefore, the HMDs 100A, 100B, and 100C are explained without being distinguished. The same applies to FIGS. 4, 5, 6, 7, and 8.

As shown in FIG. 3, the control device 10 includes a case 10A (a housing) having a flat box shape. The case 10A includes various switches, a track pad 14, and the like that receive operation by the user. The user operates the switches, the track pad 14, and the like, whereby the control device 10 functions as a control device that controls the HMD 100. The case 10A incorporates a functional section that controls the HMD 100.

The image display section 20 is a wearing body worn on the head of the user. In this embodiment, the image display section 20 has an eyeglass shape. The image display section 20 includes a right display unit 22, a left display unit 24, a right light guide plate 26, and a left light guide plate 28 in a main body including a right holding section 21, a left holding section 23, and a front frame 27.

The right holding section 21 and the left holding section 23 respectively extend backward from both end portions of the front frame 27 and, like temples of eyeglasses, hold the image display section 20 on the head of the user. Of both the end portions of the front frame 27, the end portion located on the right side of the user in a worn state of the image display section 20 is represented as an end portion ER and the end portion located on the left side of the user is represented as an end portion EL. The right holding section 21 is provided to extend from the end portion ER of the front frame 27 to a position corresponding to the right temporal region of the user in the worn state of the image display section 20. The left holding section 23 is provided to extend from the end portion EL to a position corresponding to the left temporal region of the user in the worn state of the image display section 20.

The right light guide plate 26 and the left light guide plate 28 are provided in the front frame 27. The right light guide plate 26 is located in front of the right eye of the user in the worn state of the image display section 20 and causes the right eye to visually recognize an image. The left light guide plate 28 is located in front of the left eye of the user in the worn state of the image display section 20 and causes the left eye to visually recognize the image.

The front frame 27 has a shape obtained by coupling one end of the right light guide plate 26 and one end of the left light guide plate 28 to each other. A position of the coupling corresponds to the middle of the forehead of the user in the worn state in which the user wears the image display section 20. In the front frame 27, a nose pad section in contact with the nose of the user in the worn state of the image display section 20 may be provided in the coupling position of the right light guide plate 26 and the left light guide plate 28. In this case, the image display section 20 can be held on the head of the user by the nose pad section and the right holding section 21 and the left holding section 23. A belt (not shown in the figure) in contact with the back of the head of the user in the worn state of the image display section 20 may be coupled to the right holding section 21 and the left holding section 23. In this case, the image display section 20 can be held on the head of the user by the belt.

The right display unit 22 is a unit related to display of an image by the right light guide plate 26. The right display unit 22 is provided in the right holding section 21 and located in the vicinity of the right temporal region of the user in the worn state. The left display unit 24 is a unit related to display of an image by the left light guide plate 28. The left display unit 24 is provided in the left holding section 23 and located in the vicinity of the left temporal region of the user in the worn state. Note that the right display unit 22 and the left display unit 24 are collectively simply referred to as "display driving section" as well.

The right light guide plate 26 and the left light guide plate 28 in this embodiment are optical sections formed of light transmissive resin or the like and are, for example, prisms. The right light guide plate 26 and the left light guide plate 28 guide image lights emitted by the right display unit 22 and the left display unit 24 to the eyes of the user.

The image display section 20 guides image lights respectively generated by the right display unit 22 and the left display unit 24 to the right light guide plate 26 and the left light guide plate 28 and displays an image by causing the user to visually recognize a virtual image with the image light. When the external light is transmitted through the right light guide plate 26 and the left light guide plate 28 and made incident on the eyes of the user from the front of the user, the image lights forming the virtual image and the external light are made incident on the eyes of the user. Visibility of the virtual image is affected by the intensity of the external light. Therefore, it is possible to adjust easiness of the visual recognition of the virtual image by, for example, disposing a right electronic shade 227 and a left electronic shade 247 (FIG. 5) in the front frame 27.

An HMD camera 61 is disposed in the front frame 27 of the image display section 20. The HMD camera 61 desirably images an outside scene direction visually recognized by the user in the state in which the image display section 20 is worn. The HMD camera 61 is provided in a position not blocking the external light transmitted through the right light guide plate 26 and the left light guide plate 28 on the front surface of the front frame 27. In an example shown in FIG. 3, the HMD camera 61 is disposed on the end portion ER side of the front frame 27. The HMD camera 61 may be disposed on the end portion EL side or may be disposed in the coupling portion of the right light guide plate 26 and the left light guide plate 28.

The HMD camera 61 is a digital camera including an imaging device such as a CCD or a CMOS and an imaging lens. Although the HMD camera 61 in this embodiment is a monocular camera, the HMD camera 61 may be configured by a stereo camera. The HMD camera 61 images at least a part of an outside scene (a real space) in the front side direction of the HMD 100, in other words, a visual field direction of the user in the state in which the HMD 100 is mounted. In other words, the HMD camera 61 images a range or a direction overlapping the visual field of the user and images a direction gazed by the user. The breadth of an angle of view of the HMD camera 61 can be set as appropriate. However, in this embodiment, as explained below, the angle of view includes an outside world visually recognized by the user through the right light guide plate 26 and the left light guide plate 28. More desirably, an imaging range of the HMD camera 61 is set such that the entire visual field of the user visually recognizable through the right light guide plate 26 and the left light guide plate 28 can be imaged.

The HMD camera 61 executes imaging according to control by an imaging control section 149 included in the HMD control section 141 and outputs captured image data to the imaging control section 149.

The HMD 100 includes distance sensors 64 that detect a distance to a measurement target object located in a preset measurement direction. For example, the distance sensors 64 can be configured to detect a distance to a measurement target object located in front of the user. In this embodiment, the distance sensors 64 are disposed in the coupling portion of the right light guide plate 26 and the left light guide plate 28 in the front frame 27. In this example, in the worn state of the image display section 20, the position of the distance sensors 64 is substantially the middle of both the eyes of the user in the horizontal direction and above both the eyes of the user in the vertical direction. The measurement direction of the distance sensors 64 can be set to, for example, the front side direction of the front frame 27. In other words, the measurement direction is a direction overlapping the imaging direction of the HMD camera 61.

The distance sensors 64 include, for example, light sources such as LEDs or laser diodes and light receiving sections that receive reflected light of light emitted by the light sources and reflected on the measurement target object. The distance sensors 64 only have to execute triangulation processing and distance measurement processing based on a time difference according to the control by the HMD control section 141. The distance sensors 64 may be configured to include sound sources that emit ultrasound and detecting sections that receive the ultrasound reflected on the measurement target object. In this case, the distance sensors 64 only have to execute the distance measurement processing on the basis of a time difference until the reflection of the ultrasound according to the control by the HMD control section 141.

The control device 10 and the image display section 20 are connected by a connection cable 40. The connection cable 40 is detachably connected to a connector 42 provided at an end portion of the case 10A. That is, the connector 42, into which the connection cable 40 can be inserted and from which the connection cable 40 can be pulled out, is provided in the case 10A. The connection cable 40 is connected to the connector 42 when the image display section 20 is used.

The connection cable 40 is connected from the distal end of the left holding section 23 to various circuits provided on the inside of the image display section 20. The connection cable 40 includes a metal cable or an optical fiber cable for transmitting digital data and may include a metal cable for transmitting an analog signal. A connector 46 is provided halfway in the connection cable 40.

The connector 46 is a jack (an audio connector) to which a stereo mini plug is connected. The connector 46 and the control device 10 are connected by, for example, a line for transmitting an analog sound signal. In a configuration example shown in FIG. 3, a head set 30 including a right earphone 32 and a left earphone 34 configuring a stereo headphone and a microphone 63 is connected to the connector 46.

Figure 8:
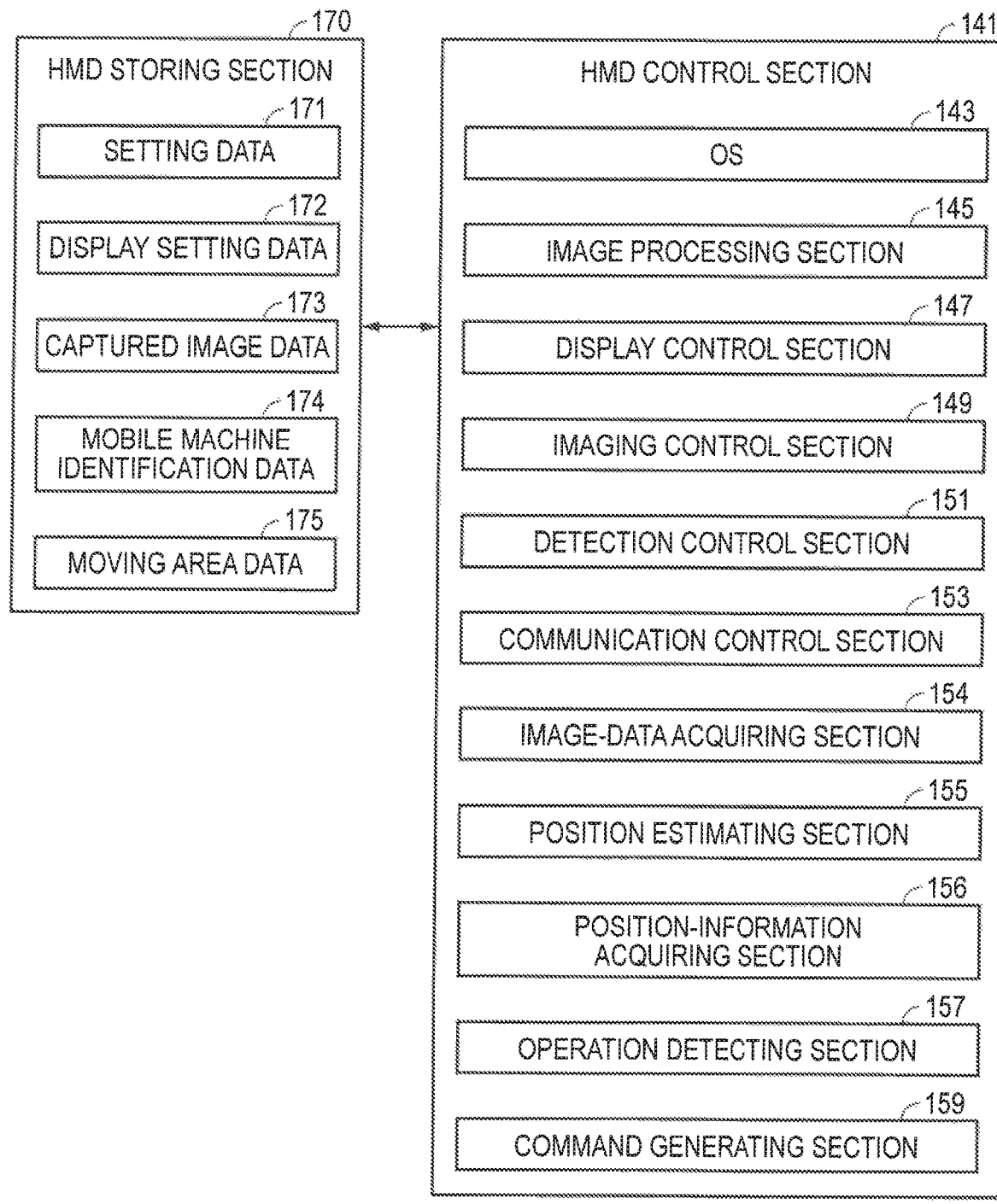
FIG. 8 is a functional block diagram of a control section and a storing section of the HMD.

For example, as shown in FIG. 3, the microphone 63 is disposed such that a sound collecting section of the microphone 63 faces the line of sight direction of the user. The microphone 63 collects sound and outputs a sound signal to a sound interface 182 (FIG. 8). For example, the microphone 63 may be a monaural microphone or may be a stereo microphone, may be a microphone having directivity, or may be a nondirectional microphone.

The control device 10 includes the track pad 14, an up-down key 15, an LED display section 17, and a power switch 18 as operated sections operated by the user. These operated sections are disposed on the surface of the case 10A. The operated sections are operated by, for example, the fingers of the user.

The track pad 14 is a region for the user to perform touch operation for bringing a finger into contact with the track pad 14 on the front surface of the case 10A. The track pad 14 may be the same plane as the front surface of the case 10A. However, the track pad 14 is desirably configured to enable the user to distinguish the track pad 14 and regions other than the track pad 14. For example, a line indicating the edge of the track pad 14 may be formed by printing or unevenness. The track pad 14 may be applied with surface treatment for differentiating a touch of the surface of the track pad 14 from a touch of the regions other than the track pad 14.

The control device 10 can detect, on the front surface of the case 10A, with a touch sensor 13 (FIG. 7) explained below, touch operation on the track pad 14 by the user. When the touch sensor 13 detects the touch operation, the control device 10 specifies a position where the operation is detected. The track pad 14 can be used for operation for inputting an absolute position or a relative position in the track pad 14.

The LED display section 17 is set on the front surface of the case 10A. The LED display section 17 is located in the track pad 14. The surface of the LED display section 17 is not different from other regions on the front surface of the case 10A. The LED display section 17 includes a transmitting section (not shown in the figure) capable of transmitting light. The LED display section 17 emits light such that one or a plurality of LEDs set immediately under the transmitting section are lit, whereby the user can visually recognize signs and the like. In the example shown in FIG. 3, the LEDs of the LED display section 17 are lit, whereby three signs of a triangle, a circle, and a square appear.

The control device 10 can detect, with the touch sensor 13, touch operation of the fingers of the user on the LED display section 17 and specify an operation position. Therefore, for example, the control device 10 can specify which of the signs appearing on the LED display section 17 the operation position corresponds to. Therefore, the LED display section 17 functions as a software button. For example, by associating the signs appearing on the LED display section 17 with the functions of the HMD 100, it is possible to detect touch operation on the LED display section 17 as operation for the functions. In the HMD 100, in the example shown in FIG. 3, the sign of the circle can be allocated to a home button. In this case, when touch operation is performed in the position of the sign of the circle, the HMD control section 141 detects operation of the home button. The sign of the square can be allocated to a history button. In this case, the HMD control section 141 detects touch operation on the sign of the square as operation of the history button. Similarly, the sign of the triangle can be allocated to a return button. The HMD control section 141 detects touch operation on the sign of the triangle as operation of the return button.

The up-down key 15 includes a pair of keys disposed on a side surface of the case 10A to detect pressing operation. The up-down key 15 is used for an instruction input for an increase or a reduction of sound volume output from the right earphone 32 and the left earphone 34 and an instruction input for an increase or a decrease of the brightness of display of the image display section 20.

The power switch 18 is a switch for switching ON/OFF of a power supply of the HMD 100.

In the case 10A, a USB connector 188 (FIG. 7) is provided on a side surface on the same side as the power switch 18. The USB connector 188 is an interface for connecting the control device 10 to an external apparatus. In this embodiment, as an example of the interface, a connector conforming to a USB standard is illustrated. The USB connector 188 is, for example, a connector having a shape and a size matching a micro USB standard. Specifications such as transfer speed are optional.

The control device 10 includes a battery 132 (FIG. 7) as explained below. The control device 10 and the image display section 20 operate with electric power supplied by the battery 132. Charging to the battery 132 can be performed by supplying electric power to the USB connector 188. In the HMD 100, charging can be performed by detaching the control device 10 and the image display section 20 and connecting only the control device 10 to a dedicated charging device.

Figure 4:
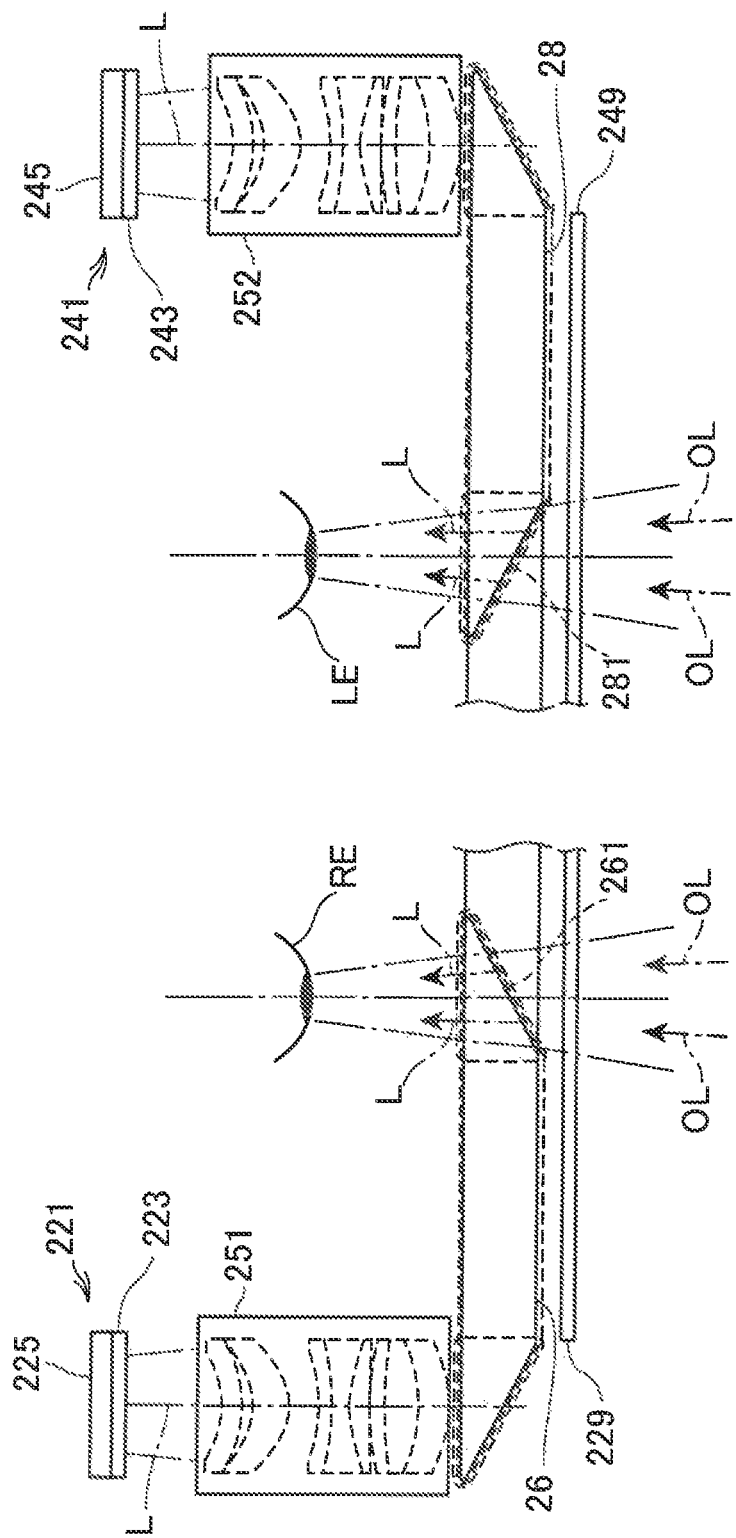
FIG. 4 is a diagram showing the configuration of an optical system of an image display section.

FIG. 4 is a main part plan view showing the configuration of an optical system included in the image display section 20. In FIG. 4, a left eye LE and a right eye RE of the user are shown for explanation.

As shown in FIG. 4, the right display unit 22 and the left display unit 24 are symmetrically configured. As a component for causing the right eye RE of the user to visually recognize an image, the right display unit 22 includes an OLED (Organic Light Emitting Diode) unit 221 that emits image light and a right optical system 251 including a lens group for guiding image light L emitted by the OLED unit 221. The image light L is guided to the right light guide plate 26 by the right optical system 251.

The OLED unit 221 includes an OLED panel 223 and an OLED driving circuit 225 that drives the OLED panel 223. The OLED panel 223 is a self-emitting display panel configured by arranging, in a matrix shape, light emitting elements that emit lights with organic electroluminescence and respectively emit color lights of R (red), G (green), and B (blue). The OLED panel 223 includes a plurality of pixels, one pixel of which is a unit including one each of R, G, and B elements. The OLED panel 223 forms an image with the pixels arranged in the matrix shape. The OLED driving circuit 225 executes selection of a light emitting element included in the OLED panel 223 and energization to the light emitting element and causes the light emitting element of the OLED panel 223 to emit light according to the control by the HMD control section 141. The OLED driving circuit 225 is fixed to the rear side of a rear surface, that is, a light emitting surface of the OLED panel 223 by bonding or the like. The OLED driving circuit 225 may be configured by, for example, a semiconductor device that drives the OLED panel 223 and may be mounted on a substrate (not shown in the figure) fixed to the rear surface of the OLED panel 223. A temperature sensor 69 (FIG. 7) is mounted on the substrate.

Note that the OLED panel 223 may be configured by arranging, in a matrix shape, light emitting elements that emit white light and disposing color filters corresponding to the colors of R, G, and B to be superimposed one on top of another. An OLED panel 223 of a WRGB configuration including a light emitting element that emits W (white) light in addition to the light emitting elements that respectively radiate the color lights of R, G, and B may be used.

The right optical system 251 includes a collimate lens that changes the image light L emitted from the OLED panel 223 to a light beam in a parallel state. The image light L changed to the light beam in the parallel state by the collimate lens is made incident on the right light guide plate 26. A plurality of reflection surfaces that reflect the image light L are formed in an optical path for guiding light on the inside of the right light guide plate 26. The image light L is guided to the right eye RE side through a plurality of times of reflection on the inside of the right light guide plate 26. A half mirror 261 (a reflection surface) located in front of the right eye RE is formed on the right light guide plate 26. The image light L is reflected on the half mirror 261 and emitted from the right light guide plate 26 toward the right eye RE. The image light L forms an image on the retina of the right eye RE and causes the user to visually recognize the image.

The left display unit 24 includes, as components for causing the left eye LE of the user to visually recognize an image, an OLED unit 241 that emits image light and a left optical system 252 including a lens group for guiding the image light L emitted by the OLED unit 241. The image light L is guided to the left light guide plate 28 by the left optical system 252.

The OLED unit 241 includes an OLED panel 243 and an OLED driving circuit 245 that drives the OLED panel 243. The OLED panel 243 is a self-emitting display panel configured the same as the OLED panel 223. The OLED driving circuit 245 executes selection of a light emitting element included in the OLED panel 243 and energization to the light emitting element and causes the light emitting element of the OLED panel 243 to emit light according to the control by the HMD control section 141. The OLED driving circuit 245 is fixed to the rear side of a rear surface, that is, a light emitting surface of the OLED panel 243 by bonding or the like. The OLED driving circuit 245 may be configured by, for example, a semiconductor device that drives the OLED panel 243 and may be mounted on a substrate (not shown in the figure) fixed to the rear surface of the OLED panel 243. A temperature sensor 239 is mounted on the substrate.

The left optical system 252 includes a collimate lens that changes the image light L emitted from the OLED panel 243 to a light beam in a parallel state. The image light L changed to the light beam in the parallel state by the collimate lens is made incident on the left light guide plate 28. The left light guide plate 28 is an optical element in which a plurality of reflection surfaces that reflect the image light L are formed and is, for example, a prism. The image light L is guided to the left eye LE side through a plurality of times of reflection on the inside of the left light guide plate 28. A half mirror 281 (a reflection surface) located in front of the left eye LE is formed on the left light guide plate 28. The image light L is reflected on the half mirror 281 and emitted from the left light guide plate 28 toward the left eye LE. The image light L forms an image on the retina of the left eye LE and causes the user to visually recognize the image.

With this configuration, the HMD 100 functions as a see-through type display device. That is, the image light L reflected on the half mirror 261 and external light OL transmitted through the right light guide plate 26 are made incident on the right eye RE of the user. The image light L reflected on the half mirror 281 and the external light OL transmitted through the half mirror 281 are made incident on the left eye LE. In this way, the HMD 100 makes the image light L of the image processed on the inside and the external light OL incident on the eyes of the user to be superimposed one on top of the other. For the user, the outside scene is seen through the right light guide plate 26 and the left light guide plate 28. An image formed by the image light L is visually recognized over the outside scene.

The half mirrors 261 and 281 are image extracting sections that reflect image lights respectively output by the right display unit 22 and the left display unit 24 and extract images. The half mirrors 261 and 281 can be considered display sections.

Note that the left optical system 252 and the left light guide plate 28 are collectively referred to as "left light guide section" as well. The right optical system 251 and the right light guide plate 26 are collectively referred to as "right light guide section" as well. The configuration of the right light guide section and the left light guide section is not limited to the example explained above. Any system can be used as long as a virtual image is formed in front of the eyes of the user using the image lights. For example, a diffraction grating may be used or a semitransmitting reflection film may be used.

The image display section 20 includes the right electronic shade 227 and the left electronic shade 247. The right electronic shade 227 includes a shade driving section 228 (FIG. 6) and a liquid crystal panel 229. The left electronic shade 247 includes a shade driving section 248 (FIG. 6) and a liquid crystal panel 249. The liquid crystal panels 229 and 249 can be referred to as transmittance adjusting plates as well.

The liquid crystal panel 229 of the right electronic shade 227 is provided on the front surface side of the right light guide plate 26, that is, the opposite side of the side of the head of the user. In FIG. 2, a state is shown in which the liquid crystal panel 229 is disposed apart from the right light guide plate 26. However, the liquid crystal panel 229 is stuck to the surface of the right light guide plate 26. The liquid crystal panel 229 is disposed to be superimposed on the right light guide plate 26 of the image display section 20.

The liquid crystal panel 249 of the left electronic shade 247 is provided on the front surface side of the left light guide plate 28, that is, the opposite side of the side of the head of the user. In FIG. 2, a state is shown in which the liquid crystal panel 249 is disposed apart from the left light guide plate 28. However, the liquid crystal panel 249 is stuck to the surface of the left light guide plate 28. The liquid crystal panel 249 is disposed to be superimposed on the left light guide plate 28 of the image display section 20.

The liquid crystal panels 229 and 249 are transmissive liquid crystal panels in which plurality of pixels are arranged in a matrix shape. The liquid crystal panels 229 and 249 are configured by any liquid crystal among TN (twisted nematic) liquid crystal, guest host liquid crystal, PDLC (Polymer Dispersed Liquid Crystal), electrochromic, and gaschromic.

The liquid crystal panels 229 and 249 increase or reduce, in pixel units, the transmittance of external light guided from the outside to the eyes RE of the user according to an increase or a decrease of a supplied voltage. In the right electronic shade 227 and the left electronic shade 247 in this embodiment, the transmittance of the external light is 100% in a state without the supplied voltage and is 0% (the external light is blocked) in a state in which the supplied voltage the maximum.

Figure 5:
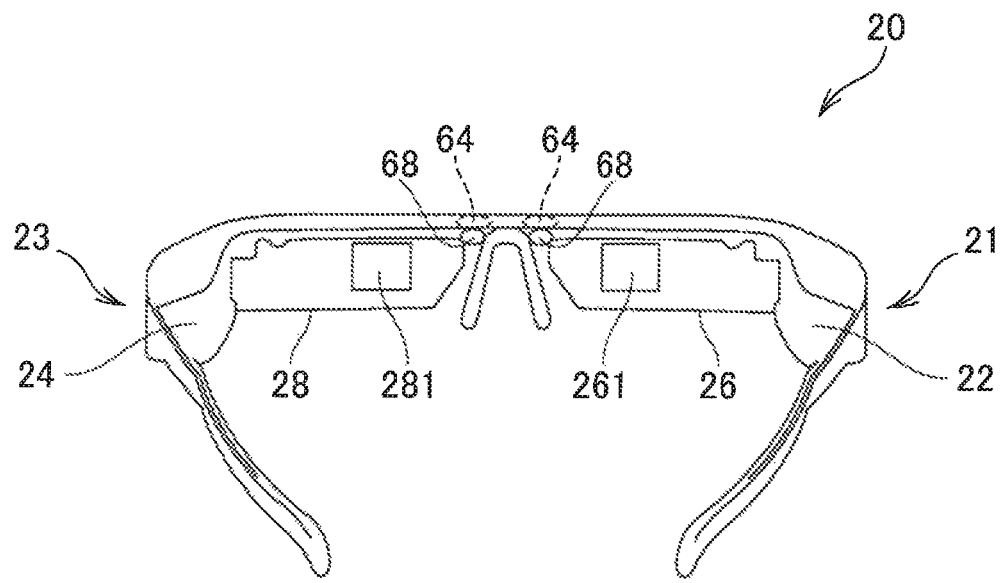
FIG. 5 is a perspective view showing the configuration of the image display section.
Figure 6:
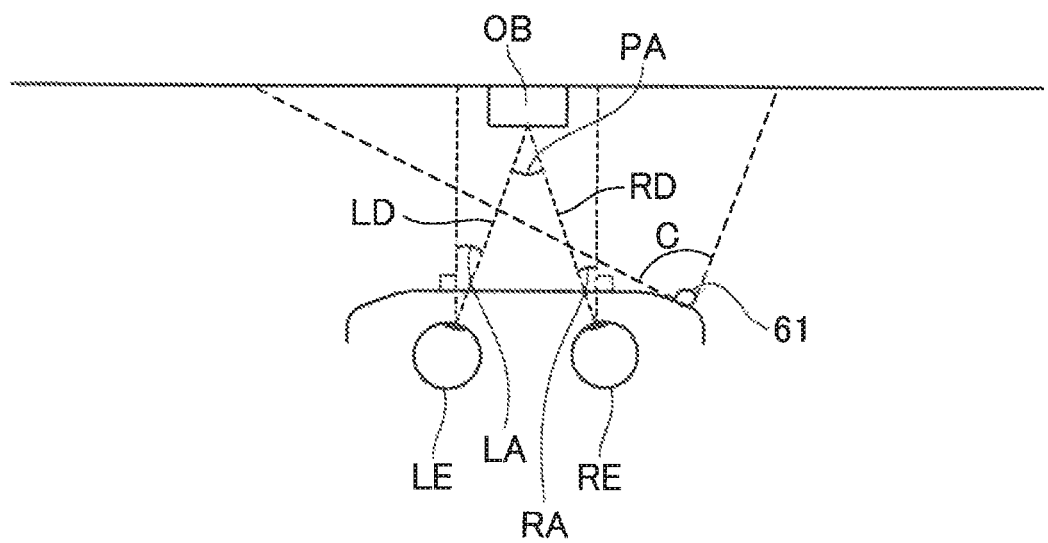
FIG. 6 is a schematic diagram showing correspondence between the image display section and an imaging range.

FIGS. 5 and 6 are diagrams showing a main part configuration of the image display section 20. FIG. 5 is a main part perspective view of the image display section 20 viewed from the head side of the user. Note that, in FIG. 5, illustration of the connection cable 40 is omitted. FIG. 6 is an explanatory diagram of the angle of view of the HMD camera 61.

In FIG. 5, a side in contact with the head of the user of the image display section 20, in other words, a side visible to the right eye RE and the left eye LE of the user is shown. In other words, the rear side of the right light guide plate 26 and the left light guide plate 28 is visible.

In FIG. 5, the half mirror 261 for irradiating image light on the right eye RE of the user and the half mirror 281 for irradiating image light on the left eye LE of the user are seen as substantially square regions. The entire right light guide plate 26 and left light guide plate 28 including the half mirrors 261 and 281 transmit external light as explained above. For this reason, for the user, an outside scene is visually recognized through the entire right light guide plate 26 and left light guide plate 28 and rectangular display images are visually recognized in the positions of the half mirrors 261 and 281.

The HMD camera 61 is disposed at the end portion on the right side in the image display section 20 and images a direction that both the eyes of the user face, that is, the front for the user. FIG. 6 is a diagram schematically showing the position of the HMD camera 61 in plan view together with the right eye RE and the left eye LE of the user. An angle of view (the imaging range) of the HMD camera 61 is indicated by C. Note that, although the angle of view C in the horizontal direction is shown in FIG. 6, an actual angle of view of the HMD camera 61 also expands in the up-down direction as in a general digital camera.

The optical axis of the HMD camera 61 is set in a direction including line of sight directions of the right eye RE and the left eye LE. An outside scene visually recognizable by the user in a state in which the user wears the HMD 100 is not always infinity. For example, as shown in FIG. 6, when the user gazes an object OB with both the eyes, lines of sight of the user are directed to the object OB as indicated by signs RD and LD in the figure. In this case, the distance from the user to the object OB is often approximately 30 cm to 10 m and more often approximately 1 m to 4 m. Therefore, concerning the HMD 100, standards of an upper limit and a lower limit of the distance from the user to the object OB during a normal use may be set. The standards may be calculated by researches and experiments or the user may set the standards. The optical axis and the angle of view of the HMD camera 61 are desirably set such that the object OB is included in the angle of view when the distance to the object OB during the normal use is equivalent to the set standard of the upper limit and when the distance is equivalent to the set standard of the lower limit.

In general, an angular field of view of a human is approximately 200 degrees in the horizontal direction and approximately 125 degrees in the vertical direction. In the angular field of view, an effective field of view excellent in an information reception ability is approximately 30 degrees in the horizontal direction and approximately 20 degrees in the vertical direction. Further, a stable field of fixation in which a gazing point gazed by the human is quickly and stably seen is approximately 60 to 90 degrees in the horizontal direction and approximately 45 to 70 degrees in the vertical direction. In this case, when the gazing point is the object OB shown in FIG. 6, a field of view of approximately 30 degree in the horizontal direction and approximately 20 degrees in the vertical direction centering on the lines of sight RD and LD is the effective field of view. A field of view of approximately 60 to 90 degrees in the horizontal direction and approximately 45 to 70 degrees in the vertical direction is the stable field of fixation. A field of view of approximately 200 degrees in the horizontal direction and approximately 125 degrees in the vertical direction is the angular field of view. Further, an actual field of view visually recognized by the user through the image display section 20 and through the right light guide plate 26 and the left light guide plate 28 can be referred to as real field of view (FOV). In the configuration in this embodiment shown in FIG. 3, the real field of view is equivalent to an actual field of view visually recognized by the user through the right light guide plate 26 and the left light guide plate 28. The real field of view is narrower than the angular field of view and the stable field of fixation but is wider than the effective field of view.

The angle of view C of the HMD camera 61 desirably enables imaging of a range wider than the field of view of the user. Specifically, the angle of view C is desirably wider than at least the effective field of view of the user. The angle of view C is more desirably wider than the real field of view of the user. The angle of view C is still more desirably wider than the stable field of fixation. The angle of view C is most desirably wider than the angular field of view of both the eyes of the user.

The HMD camera 61 may include a so-called wide-angle lens as an imaging lens and may be capable of imaging a wide angle of view. The wide-angle lens may include lenses called super-wide angle lens and semi-wide angle lens. The wide-angle lens may be a single focus lens or may be a zoom lens. The HMD camera 61 may include a lens group including a plurality of lenses.

The distance sensors 64 are disposed to face forward in the center between the right light guide plate 26 and the left light guide plate 28. For example, the distance sensors 64 are configured, from the center position of the image display section 20, to be capable of detecting the distance to an object located in the front direction of the user like the object OB shown in FIG. 6. The user wearing the HMD 100 turns the head to a gazing direction. Therefore, a gazing target can be considered to be present in the front of the image display section 20. Therefore, if the front of the image display section 20 is assumed to be a detecting direction 64A, the distance sensors 64 disposed in the center of the image display section 20 can detect the distance to the target gazed by the user.

As shown in FIG. 5, inner cameras 68 are disposed on the user side of the image display section 20. A pair of inner cameras 68 is provided in the center position between the right light guide plate 26 and the left light guide plate 28 to respectively correspond to the right eye RE and the left eye LE of the user. The inner cameras 68 are a pair of cameras that respectively images the right eye RE and the left eye LE of the user. The inner cameras 68 perform the imaging according to the control by the HMD control section 141. The HMD control section 141 analyzes captured image data of the inner cameras 68. For example, the HMD control section 141 detects reflected light on the eyeball surfaces of the right eye RE and the left eye LE and an image of the pupils from the captured image data of the inner cameras 68 and specifies a line of sight direction of the user. The HMD control section 141 can calculate a change in the line of sight direction of the user. The HMD control section 141 may detect respective eyeball motions of the right eye RE and the left eye LE.

The movement of the line of sight of the user can also be regarded as a movement of an imaginary visual point of the user.

The HMD control section 141 may extract an image of the eyelids of the right eye RE and the left eye LE of the user from the captured image data of the inner cameras 68 and detect eyelid motions or detect states of the eyelids. In this embodiment, a configuration is illustrated in which the image display section 20 includes the pair of inner cameras 68, 68. However, for example, one inner camera 68 may be provided in the center position of the image display section 20. In this case, the one inner camera 68 desirably has an angle of view for enabling imaging of the right eye RE and the left eye LE. However, for example, only one of the right eye RE and the left eye LE may be imaged by the inner camera 68. That is, the HMD control section 141 may detect a line of sight direction, an eyeball motion, an eyelid motion, a state of the eyelid, and the like of either one of the right eye RE and the left eye LE.

When detecting the line of sight directions of the right eye RE and the left eye LE from the captured images of the inner cameras 68, the HMD control section 141 can calculate an angle of convergence of the right eye RE and the left eye LE. In FIG. 6, the angle of convergence is indicated by a sign PA. The angle of convergence PA corresponds to the distance to the object OB gazed by the user. That is, when the user three-dimensionally visually recognizes an image or an object, the angle of convergence of the right eye RE and the left eye LE is decided according to the distance to the visually recognized object. Therefore, it is possible to calculate the distance of the gazing of the user by detecting the angle of convergence. It is possible to induce a stereoscopic vision by displaying an image to induce the angle of convergence of the user.

The angle of convergence can be calculated from, for example, the captured image data of the inner cameras 68. For example, a line of sight direction of the right eye RE is calculated from the captured image data of the inner cameras 68. An angle LA in the line of sight direction of the right eye RE with respect to the front direction of the right eye RE is calculated from the line of sight direction. Similarly, a line of sight direction of the left eye LE is calculated from the captured image data of the inner cameras 68. An angle RA in the line of sight direction of the left eye LE with respect to the front direction of the left eye LE is calculated from the line of sight direction. The angle of convergence PA is equal to a sum of the angles LA and RA. It is possible to easily calculate the angle of convergence PA.

Figure 7:
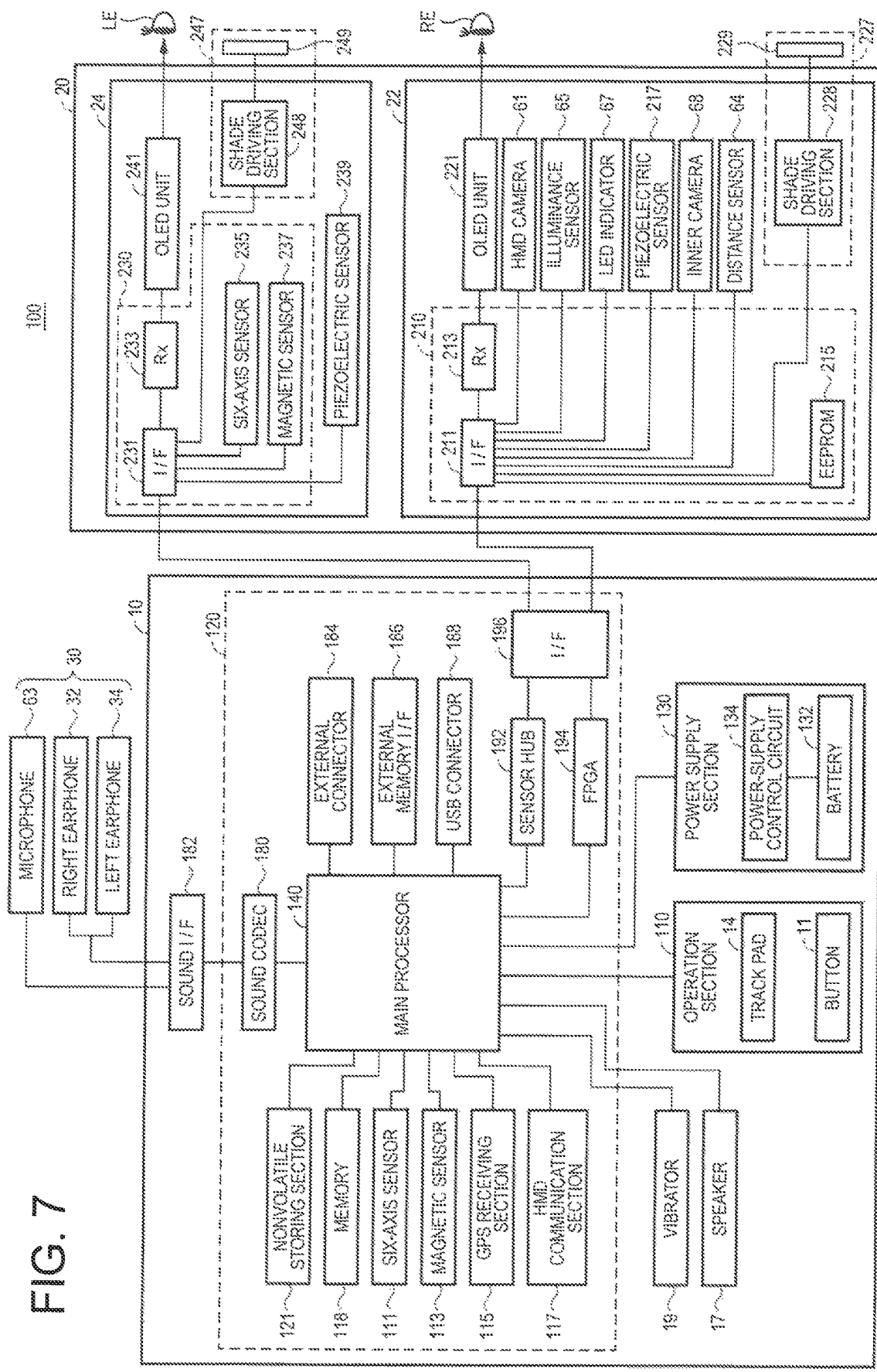
FIG. 7 is a block diagram of the HMD.

FIG. 7 is a block diagram showing the configurations of the sections configuring the HMD 100.

The control device 10 includes a main processor 140 that executes a computer program and controls the HMD 100. A memory 118 and a nonvolatile storing section 121 are connected to the main processor 140. An operation section 110 is connected to the main processor 140 as an input device. A six-axis sensor 111, a magnetic sensor 113, and a GPS 115 are connected to the main processor 140 as sensors. An HMD communication section 117 (a communication section), a sound codec 180, an external connector 184, an external memory interface 186, the USB connector 188, a sensor hub 192, and an FPGA 194 are connected to the main processor 140. These sections function as interfaces with the outside.

The main processor 140 is mounted on a controller board 120 incorporated in the control device 10. The memory 118, the nonvolatile storing section 121, and the like may be mounted on the controller board 120 in addition to the main processor 140. In this embodiment, the six-axis sensor 111, the magnetic sensor 113, the GPS 115, the HMD communication section 117, the memory 118, the nonvolatile storing section 121, the sound coded 180, and the like are mounted on the controller board 120. The external connector 184, the external memory interface 186, the USB connector 188, the sensor hub 192, the FPGA 194, and an interface 196 may be mounted on the controller board 120.

The memory 118 configures a work area where, when the main processor 140 executes a computer program, the main processor 140 temporarily stores the computer program to be executed and data to be processed. The nonvolatile storing section 121 is configured by a flash memory or an eMMC (embedded Multi Media Card). The nonvolatile storing section 121 stores the computer program to be executed by the main processor 140 and various data to be processed by the main processor 140 executing the computer program.

The main processor 140 detects contact operation on the operation surface of the track pad 14 and acquires an operation position on the basis of an operation signal input from the operation section 110.

The operation section 110 includes buttons 11, a touch sensor 13, and an LED display section 17. The touch sensor 13 detects touch operation on the track pad 14 and specifies an operation position of the detected touch operation. In this case, the operation section 110 outputs a control signal including data indicating the touch position on the track pad 14 to the main processor 140. When operation of the buttons 11 is performed and when the touch sensor 13 detects the touch operation, an operation signal is output from the operation section 110 to the main processor 140.

The LED display section 17 includes an LED (not shown in the figure) disposed immediately below the track pad 14 (FIG. 3) and a driving circuit that lights the LED. The LED display section 17 lights, flashes, and extinguishes the LED according to the control by the main processor 140.

The six-axis sensor 111 is a motion sensor (an inertial sensor) including a three-axis acceleration sensor and a three-axis gyro (angular velocity) sensor. As the six-axis sensor 111, an IMU (Inertial Measurement Unit) obtained by modularizing the sensors may be adopted.

The magnetic sensor 113 is, for example, a three-axis terrestrial magnetism sensor.

The GPS (Global Positioning System) 115 includes a not-shown GPS antenna, receives radio signals transmitted from GPS satellites, and detects a coordinate of a present position of the control device 10.

The six-axis sensor 111, the magnetic sensor 113, and the GPS 115 output detection values to the main processor 140 according to sampling cycles designated in advance. Alternatively, the six-axis sensor 111, the magnetic sensor 113, the GPS 115 output, in response to a request of the main processor 140, the detection values to the main processor 140 at timing designated by the main processor 140.

The HMD communication section 117 executes wireless communication between the HMD communication section 117 and an external apparatus. In this embodiment, the HMD communication section 117 executes wireless communication with HMD communication sections 117 included in the other HMDs 100. The HMD communication section 117 includes an antenna, an RF circuit, a baseband circuit, and a communication control circuit. Alternatively, the HMD communication section 117 is configured by a device obtained by integrating the antenna, the RF circuit, the baseband circuit, and the communication control circuit, and the like. The HMD communication section 117 performs wireless communication conforming to the standards such as the Bluetooth and the wireless LAN (including Wi-Fi).

The HMD communication section 117 performs the wireless communication with the mobile-machine communication section 343 included in the mobile machine 310. In this configuration, a frequency band and a communication system used for the communication by the HMD communication section 117 only have to be selected as appropriate such that the HMD communication section 117 can communicate with the mobile-machine communication section 343. Therefore, like the mobile-machine communication section 343, the HMD communication section 117 executes the wireless communication in a 27 MHz band, a 40 MHz band, a 2.4 GHz band, and the like, which are frequencies for radio control. Alternatively, the mobile-machine communication section 343 performs the wireless communication conforming to the standards such as the Bluetooth and the wireless LAN (including Wi-Fi).

The HMD 100 may include a communication section (not shown in the figure) separate from the HMD communication section 117 and perform communication with the mobile-machine communication section 343 through the communication section.

The HMD communication section 117 included in the HMD 100A executes communication with the mobile machine 310A. Similarly, the HMD communication section 117 included in the HMD 100B communicates with the mobile machine 310B. The HMD communication section 117 included in the HMD 100C communicates with the mobile machine 310C.

The HMD communication section 117 is also capable of executing communication with the HMD communication sections 117 included in the other HMDs 100. Therefore, as explained below, the HMDs 100A, 100B, and 100C configuring the mobile-machine composite control system 1 can mutually transmit and receive data. Further, the HMD communication section 117 of the HMD 100A may be capable of transmitting data including commands not only to the mobile machine 310A but also to the mobile machines 310B and 310C. Similarly, the HMDs 100B and 100C may be capable of transmitting data to the mobile machines 310A, 310B, and 310C. In this case, for example, the HMD 100A may transmit position information of the mobile machine 310A to the mobile machines 310B and 310C and cause the mobile machines 310B and 310C to perform operation for avoiding excessive approach.

The sound interface 182 is an interface that inputs and outputs sound signals. In this embodiment, the sound interface 182 includes the connector 46 (FIG. 3) provided in the connection cable 40. The sound codec 180 is connected to the sound interface 182 and performs encoding/decoding of the sound signals input and output via the sound interface 182. The sound codec 180 may include an A/D converter that performs conversion from an analog sound signal into digital sound data and a D/A converter that performs conversion opposite to the conversion of the A/D converter. For example, the HMD 100 in this embodiment outputs sound with the right earphone 32 and the left earphone 34 and collects sound with the microphone 63. The sound codec 180 converts digital sound data output by the main processor 140 into an analog sound signal and outputs the analog sound signal via the sound interface 182. The sound codec 180 converts an analog sound signal input to the sound interface 182 into digital sound data and outputs the digital sound data to the main processor 140.

The external connector 184 is a connector to which an external apparatus communicating with the main processor 140 is connected. The external connector 184 is an interface to which the external apparatus is connected, for example, when the external apparatus is connected to the main processor 140 and debagging of a computer program executed by the main processor 140 and collection of a log of the operation of the HMD 100 are performed.

The external memory interface 186 is an interface to which a portable memory device is connectable. The external memory interface 186 includes, for example, a memory card slot, into which a card-type recording medium is inserted to enable reading of data, and an interface circuit. A size, a shape, and a standard of the card-type recording medium in this case are not limited and can be changed as appropriate.

The USB connector 188 includes a connector conforming to the USB standard and an interface circuit. A USB memory device, a smartphone, a computer, and the like can be connected to the USB connector 188. A size and a shape of the USB connector 188 and a version of the USB standard matching the USB connector 188 can be selected and changed as appropriate.

The HMD 100 includes a vibrator 19. The vibrator 19 includes a motor (not shown in the figure) and an eccentric rotor (not shown in the figure). The vibrator 19 generates vibration according to the control by the main processor 140. For example, when operation on the operation section 110 is detected or when the power supply of the HMD 100 is turned on and off, the HMD 100 generates vibration with the vibrator 19 in a predetermined vibration pattern.

The sensor hub 192 and the FPGA 194 are connected to the image display section 20 via the interface (I/F) 196. The sensor hub 192 acquires detection values of the various sensors included in the image display section 20 and outputs the detection values to the main processor 140. The FPGA 194 executes processing of data transmitted and received between the main processor 140 and the sections of the image display section 20 and transmission of the data via the interface 196.

The right display unit 22 and the left display unit 24 of the image display section 20 are respectively connected to the control device 10. As shown in FIG. 3, in the HMD 100, the connection cable 40 is connected to the left holding section 23. A wire joined to the connection cable 40 is laid on the inside of the image display section 20. The right display unit 22 and the left display unit 24 are respectively connected to the control device 10.

The right display unit 22 includes a display unit board 210. An interface (I/F) 211 connected to the interface 196, a receiving section (Rx) 213 that receives data input from the control device 10 via the interface 211, and an EEPROM 215 (storing section) are mounted on the display unit board 210.

The interface 211 connects the receiving section 213, the EEPROM 215, a temperature sensor 217, the HMD camera 61, an illuminance sensor 65, an LED indicator 67, and the shade driving section 228 to the control device 10.

The EEPROM (Electrically Erasable Programmable ROM) 215 stores various data to enable the main processor 140 to read the data. The EEPROM 215 stores, for example, data concerning a light emission characteristic and a display characteristic of the OLED units 221 and 241 included in the image display section 20 and data concerning characteristics of the sensors included in the right display unit 22 or the left display unit 24. Specifically, the EEPROM 215 stores parameters related to gamma correction of the OLED units 221 and 241, data for compensating for detection values of the temperature sensors 217 and 239, and the like. These data are generated by a test during factory shipment of the HMD 100 and written in the EEPROM 215. After the shipment, the main processor 140 can perform processing using the data of the EEPROM 215.

The HMD camera 61 executes imaging according to a signal input via the interface 211 and outputs captured image data or a signal indicating an imaging result to the control device 10.

As shown in FIG. 3, the illuminance sensor 65 is provided at the end portion ER of the front frame 27 and disposed to receive external light from the front of the user wearing the image display section 20. The illuminance sensor 65 outputs a detection value corresponding to a received light amount (light reception intensity).

As shown in FIG. 3, the LED indicator 67 is disposed near the HMD camera 61 at the end portion ER of the front frame 27. The LED indicator 67 is lit during execution of imaging by the HMD camera 61 to inform that the imaging is being performed.

The temperature sensor 217 detects temperature and outputs a voltage value or a resistance value corresponding to the detected temperature as a detection value. The temperature sensor 217 is mounted on the rear surface side of the OLED panel 223 (FIG. 4). The temperature sensor 217 may be mounted on, for example, the same substrate as the OLED driving circuit 225. With this configuration, the temperature sensor 217 mainly detects the temperature of the OLED panel 223.

The inner cameras 68 execute imaging according to a signal input from the control device 10 via the interface 211 and output captured image data or signals indicating imaging results to the control device 10. In FIG. 7, one inner camera 68 is shown. However, the pair of inner cameras 68 shown in FIG. 5 may simultaneously operate. The respective pair of inner cameras 68 may be connected to the interface 211 and independently operate.

The distance sensors 64 execute distance detection according to a signal input from the control device 10 via the interface 211 and output signals indicating detection results to the control device 10. In FIG. 7, one distance sensor 64 is shown. However, the pair of distance sensors 64, 64 shown in FIG. 5 may simultaneously operate. The respective pair of distance sensors 64, 64 may be connected to the interface 211 and independently operate.

The shade driving section 228 controls, according to the main processor 140, a voltage supplied to the right electronic shade 227 and increases or reduces, in pixel units, the transmittance of external light of the right electronic shade 227.

The receiving section 213 receives data transmitted by the main processor 140 via the interface 211. When receiving image data of an image displayed by the OLED unit 221, the receiving section 213 outputs the received image data to the OLED driving circuit 225 (FIG. 4).

The left display unit 24 includes a display unit board 210. An interface (I/F) 231 connected to the interface 196 and a receiving section (Rx) 233 that receives data input from the control device 10 via the interface 231 are mounted on the display unit board 210. A six-axis sensor 235 (a movement sensor) and a magnetic sensor 237 are mounted on the display unit board 210.

The interface 231 connects the receiving section 233, the six-axis sensor 235, the magnetic sensor 237, the temperature sensor 239, and the shade driving section 248 to the control device 10.

The six-axis sensor 235 is a motion sensor (an inertial sensor) including a three-axis acceleration sensor and a three-axis gyro (angular velocity) sensor. As the six-axis sensor 235, an IMU (Inertial Measurement Unit) obtained by modularizing the sensors may be adopted.

The magnetic sensor 237 is, for example, a three-axis terrestrial magnetism sensor.

The temperature sensor 239 detects temperature and outputs a voltage value or a resistance value corresponding to the detected temperature as a detection value. The temperature sensor 239 is mounted on the rear surface side of the OLED panel 243 (FIG. 4). The temperature sensor 239 may be mounted on, for example, the same substrate as the OLED driving circuit 245. With this configuration, the temperature sensor 239 mainly detects the temperature of the OLED panel 243.

The temperature sensor 239 may be incorporated in the OLED panel 243 or the OLED driving circuit 245. The substrate may be a semiconductor substrate. Specifically, when the OLED panel 243 functioning as an Si-OLED is mounted as an integrated circuit on an integrated semiconductor chip together with the OLED driving circuit 245 and the like, the temperature sensor 239 may be mounted on the semiconductor chip.

The shade driving section 248 controls, according to the main processor 140, a voltage supplied to the left electronic shade 247 and increases or reduces, in pixel units, the transmittance of external light of the left electronic shade 247.

The HMD camera 61, the distance sensors 64, the illuminance sensor 65, the inner cameras 68, and the temperature sensor 217 included in the right display unit 22 and the six-axis sensor 235, the magnetic sensor 237, and the temperature sensor 239 included in the left display unit 24 are connected to the sensor hub 192. The sensor hub 192 performs setting and initialization of sampling cycles of the sensors according to the control by the main processor 140. The sensor hub 192 executes energization to the sensors, transmission of control data, acquisition of detection values, and the like according to the sampling cycles of the sensors. The sensor hub 192 outputs detection values of the sensors included in the right display unit 22 and the left display unit 24 to the main processor 140 at preset timing. The sensor hub 192 may include a function of temporarily retaining the detection values of the sensors according to the timing of the output to the main processor 140. The sensor hub 192 may include a function of coping with differences in signal formats or data formats of output values of the sensors, converting the output values into data of a standardized data format, and outputting the data to the main processor 140.

The sensor hub 192 starts and stops energization to the LED indicator 67 according to the control by the main processor 140 and lights or flashes the LED indicator 67 according to timings when the HMD camera 61 starts and ends imaging.

The control device 10 includes a power supply section 130 and operates with electric power supplied from the power supply section 130. The power supply section 130 includes a chargeable battery 132 and a power-supply control circuit 134 that performs detection of a residual capacity of the battery 132 and control of charging to the battery 132. The power-supply control circuit 134 is connected to the main processor 140 and outputs a detection value of the residual capacity of the battery 132 or a detection value of a voltage to the main processor 140. The control device 10 may supply electric power to the image display section 20 on the basis of the electric power supplied by the power supply section 130. The main processor 140 may be capable of controlling a supply state of electric power from the power supply section 130 to the sections of the control device 10 and the image display section 20.

The HMD 100 may include an interface (not shown in the figure) that connects various external devices functioning as supply sources of contents. The interface may be an interface adapted to wired connection such as a USB interface, a micro USB interface, or an interface for a memory card or may be configured by a wireless communication interface. An external device in this case is an image supply device that supplies an image to the HMD 100. A personal computer (PC), a cellular phone terminal, a portable game machine, or the like is used. In this case, the HMD 100 can output an image and sound based on content data input from the external devices.

FIG. 8 is a functional block diagram of an HMD storing section 170 and the HMD control section 141 configuring a control system of the control device 10. The HMD storing section 170 shown in FIG. 8 is a logical storing section configured by the nonvolatile storing section 121 (FIG. 7). The HMD storing section 170 may include the EEPROM 215. The main processor 140 executes computer programs, whereby the HMD control section 141 and the various functional sections included in the HMD control section 141 are formed by cooperation of software and hardware. The HMD control section 141 and the functional sections configuring the HMD control section 141 are configured by, for example, the main processor 140, the memory 118, and the nonvolatile storing section 121.

The HMD control section 141 executes various kinds of processing using data stored by the HMD storing section 170 and controls the HMD 100.

The HMD storing section 170 stores various data processed by the HMD control section 141. The HMD storing section 170 stores setting data 171, display setting data 172, captured image data 173, mobile machine identification data 174, and moving area data 175.

The HMD storing section 170 may store content data including contents including images and videos displayable by the image display section 20.

The setting data 171 includes various set values related to the operation of the HMD 100. When the HMD control section 141 uses parameters, a determinant, an arithmetic expression, an LUT (Look UP Table), and the like when controlling the HMD 100, the parameters, the determinant, the arithmetic expression, the LUT (Look UP Table), and the like may be included in the setting data 171.

The display setting data 172 is data concerning an image displayed by the image display section 20. Specifically, the display setting data 172 includes setting concerning a display form of an image in the case in which the user pilots the mobile machine 310.

The display setting data 172 includes, for example, information such as a display size and a display position in the case in which image data received by the HMD communication section 117 from the mobile machine 310 is displayed on the image display section 20. The HMD control section 141 is capable of displaying, on the image display section 20, images and regions allocated with specific functions such as icons, widgets, and a menu screen. The HMD control section 141 can realize a GUI (Graphical User Interface) using the images and the regions. The display setting data 172 may include information concerning necessity of the display, display positions, and the like of the images and the regions or may include image data for displaying the images and the regions.

The captured image data 173 is image data received from the mobile machine 310. The HMD control section 141 causes the HMD storing section 170 to store, as the captured image data 173, the image data received from the mobile machine 310.

The HMD control section 141 of the HMD 100A stores, as the captured image data 173, captured image data received from the mobile machine 310A. As explained above, the HMDs 100A, 100B, and 100C are capable of mutually performing data communication. For example, the HMDs 100A, 100B, and 100C can transmit and receive captured image data respectively captured by the mobile machines 310A, 310B, and 310C with the mobile machine cameras 335. In this case, the HMDs 100A, 100B, and 100C store, as the captured image data 173, captured image data received from the other HMDs 100. Specifically, when receiving captured image data of the mobile machines 310B and 310C from the HMDs 100B and 100C, the HMD 100A stores the captured image data as the captured image data 173. The same applies to the HMDs 100B and 100C.

The mobile machine identification data 174 includes information for identifying the mobile machine 310 with which the control device 10 communicates. The mobile machine identification data 174 may include a model name, a model number, a manufacturer name, a manufacturing number, and a peculiar ID set during manufacturing of the mobile machine 310. Alternatively, the mobile machine identification data 174 may include identification information such as an ID of the mobile machine 310 set by the user. The HMDs 100A, 100B, and 100C can respectively identify the mobile machines 310A, 310B, and 310C using the mobile machine identification data 174.

The mobile machine identification data 174 may include information for authentication used by the HMD 100 to authenticate the mobile machine control system 300. When the control device 10 communicates with the mobile machine 310 through the HMD communication section 117, the mobile machine identification data 174 may include information necessary for the communication. Specifically, the mobile machine identification data 174 may include, for example, authentication information for communication such as a network address, a network ID, and a password.

The moving area data 175 includes information concerning a moving area set in advance as a region to which the mobile machine 310 is moved (flown). For example, the moving area includes regions (air regions and ground regions) in which the mobile machines 310A, 310B, and 310C move (fly). The moving area data 175 is map data including the air regions and the ground regions. The moving area data 175 is not limited to data concerning plane positions and may include data concerning altitudes.

The data included in the moving area data 175 and the positions of the mobile machines 310A, 310B, and 310C can be associated by latitude and longitude capable of indicating absolute positions in the real space. The data included in the moving area data 175 and the positions of the mobile machines 310A, 310B, and 310C may be able to be associated by relative positions with respect to a reference position set in the real space.

The HMD control section 141 includes functions of an operating system (OS) 143, an image processing section 145, a display control section 147, an imaging control section 149, a detection control section 151, a communication control section 153, an image-data acquiring section 154, a position estimating section 155, a position-information acquiring section 156, an operation detecting section 157, and a command generating section 159.

The function of the operating system 143 is a function of a control program stored by the HMD storing section 170. The other sections of the HMD control section 141 are functions of application programs executed on the operating system 143.

The image processing section 145 generates, on the basis of image data of an image or a video displayed by the image display section 20, signals transmitted to the right display unit 22 and the left display unit 24. The signals generated by the image processing section 145 may be a vertical synchronization signal, a horizontal synchronization signal, a clock signal, an analog image signal, and the like.

The image processing section 145 may perform, according to necessity, resolution conversion processing for converting the resolution of the image data into resolution suitable for the right display unit 22 and the left display unit 24. The image processing section 145 may execute, for example, image adjustment processing for adjusting the luminance and the chroma of the image data and 2D/3D conversion processing for creating 2D image data from 3D image data or creating 3D image data from 2D image data. When executing these kinds of image processing, the image processing section 145 generates a signal for displaying an image on the basis of image data after the processing and transmits the signal to the image display section 20 via the connection cable 40.

Besides being realized by the main processor 140 executing a computer program, the image processing section 145 may be configured by hardware (e.g., a DSP (Digital Signal Processor)) separate from the main processor 140.

The display control section 147 generates a control signal for controlling the right display unit 22 and the left display unit 24 and controls, with the control signal, generation and emission of image lights by the right display unit 22 and the left display unit 24. Specifically, the display control section 147 controls the OLED driving circuits 225 and 245 to execute display of images by the OLED panels 223 and 243. The display control section 147 performs, for example, control of timing when the OLED driving circuits 225 and 245 perform drawing on the OLED panels 223 and 243 on the basis of signals output by the image processing section 145 and control of the luminance of the OLED panels 223 and 243.

The display control section 147 causes, on the basis of the display setting data 172, the image display section 20 to display various images. For example, the display control section 147 causes the image display section 20 to display icons, widgets, menus, and the like according to setting of the display setting data 172.

The imaging control section 149 controls the HMD camera 61 to execute imaging, generates captured image data, and temporarily stores the captured image data in the HMD storing section 170. When the HMD camera 61 is configured as a camera unit including a circuit that generates captured image data, the imaging control section 149 acquires the captured image data from the HMD camera 61 and temporarily stores the captured image data in the HMD storing section 170.

The imaging control section 149 may control the inner cameras 68 to image the right eye RE and the left eye LE of the user. In this case, the HMD control section 141 may analyze captured image data captured by the inner cameras 68 according to the control by the imaging control section 149 and detect motions of the right eye RE and the left eye LE of the user. In this case, the HMD control section 141 may calculate a moving direction, a movement amount, and the like concerning each of or at least either one of the right eye RE and the left eye LE.

The detection control section 151 acquires detection values of the various sensors included in the HMD 100. The sensors controlled by the detection control section 151 includes, for example, the six-axis sensor 111, the magnetic sensor 113, the temperature sensor 217, the six-axis sensor 235, the magnetic sensor 237, the distance sensors 64, and the illuminance sensor 65. The sensors may include the GPS 115.

The detection control section 151 functions as a receiving section and receives operation on the HMD 100. The detection control section 151 detects operation on the buttons 11 and the touch sensor 13 included in the control device 10. The detection control section 151 detects operation by movement of the control device 10 on the basis of detection values and/or changes in the detection values of the six-axis sensor 111 and the magnetic sensor 113 included in the control device 10. The detection control section 151 detects operation by movement of the image display section 20 on the basis of detection values and/or changes in the detection values of the six-axis sensor 235 and the magnetic sensor 237 included in the image display section 20. For example, the detection control section 151 detects the operation when the movement of the control device 10 and/or the image display section 20 corresponds to a movement of a preset form.

The communication control section 153 controls the HMD communication section 117 to execute communication between the HMD communication section 117 and the mobile machine 310 and the other HMDs 100. That is, the communication control section 153 of the HMD 100A executes communication with the mobile machine 310A and further executes communication with the HMDs 100B and 100C through the HMD communication section 117.

The image-data acquiring section 154 receives, using data communication executed according to the control by the communication control section 153, captured image data transmitted from the mobile machine 310. For example, the image-data acquiring section 154 extracts data corresponding to the captured image data from data transmitted and received by the HMD communication section 117 according to the control by the communication control section 153.

The image-data acquiring section 154 included in the HMD 100A may receive captured image data transmitted by the mobile machine 310A or may receive captured image data transmitted by the mobile machines 310B and 310C. When the HMDs 100B and 100C transmit captured image data received from the mobile machine 310 to the HMD 100A, the image-data acquiring section 154 included in the HMD 100A may receive the transmitted captured image data. These functions are the same in the image-data acquiring sections 154 included in the HMDs 100B and 100C.

The position estimating section 155 estimates a position of the mobile machine 310. The position estimating section 155 may specify the position of the mobile machine 310 on the basis of position information of the mobile machine 310. That is, the position estimating section 155 may estimate the position of the mobile machine 310 on the basis of mobile machine position information acquired by the position-information acquiring section 156 explained below. Alternatively, in a state in which the mobile machine 310 is located in the moving area, the position estimating section 155 performs processing for estimating a position of the mobile machine 310 on the basis of captured image data transmitted by the mobile machine 310.

The position estimating section 155 of the HMD 100A estimates a position of the mobile machine 310A. The position estimating section 155 of the HMD 100A may be capable of estimating positions of the mobile machines 310B and 310C on the basis of data received from the HMDs 100B and 100C.

The position-information acquiring section 156 acquires mobile machine position information of the mobile machine 310 using data communication executed according to the control by the communication control section 153. For example, the position-information acquiring section 156 extracts data corresponding to the mobile machine position information from various data received by the HMD communication section 117 according to the control by the communication control section 153.

The position-information acquiring section 156 included in the HMD 100A may receive mobile machine position information transmitted by the mobile machine 310A or may receive mobile machine position information transmitted by the mobile machines 310B and 310C. When the HMDs 100B and 100C transmit mobile machine position information received from the mobile machine 310 to the HMD 100A, the position-information acquiring section 156 included in the HMD 100A may receive the transmitted mobile machine position information. These functions are the same in the position-information acquiring sections 156 included in the HMDs 100B and 100C.

The operation detecting section 157 (a position designating section) detects operation by the user wearing the image display section 20 and detects, for example, position indicating operation. The operation detecting section 157 analyzes captured image data captured by the HMD camera 61 according to the control by the imaging control section 149 and extracts an image of a pointer (a finger, a hand, or another part of the body of the user, another object, or the like) from the captured image data. The operation detecting section 157 specifies a position of the image of the pointer in the captured image data and converts the specified position into a relative position with respect to the image display section 20. The operation detecting section 157 outputs the position after the conversion as an operation position. Consequently, the user wearing the image display section 20 can perform the position indicating operation by locating the pointer in the imaging range of the HMD camera 61 or moving the pointer in the imaging range.

The command generating section 159 generates a command according to the operation detected by the detection control section 151 or the operation detected by the operation detecting section 157. The command generated by the command generating section 159 is a command for operating the mobile machine 310. The command is, for example, a command for instructing a rise (floating), a fall, an advance (movement), a retraction, a turn (rotation), a reverse turn (reverse rotation), and the like, a command for instructing the mobile machine 310 to perform a routine operation, or a command for instructing the mobile machine 310 to transmit captured image data. The command generated by the command generating section 159 is transmitted to the mobile machine 310 by the HMD communication section 117.

A data format of the command (equivalent to the command according to the invention) generated by the command generating section 159 and a process for processing the command are not particularly limited as long as the command instructs the operation of the mobile machine 310. Specifically, the command generated by the command generating section 159 may be a command for the mobile-machine control section 341 to control the sections in the mobile machine 310, that is, an internal command itself of the mobile machine 310 or may be data serving as a source for causing the mobile-machine control section 341 to generate the internal command. For example, the mobile-machine control section 341 may receive a command generated by the command generating section 159 and transmitted by the HMD communication section 117 and generate, on the basis of the command, an internal command for controlling the flight control section 345, the camera control section 346, the indicator 349, and the like. Therefore, the command generating section 159 may have a function of generating an internal command for the mobile-machine control section 341 to control the flight control section 345, the camera control section 346, the indicator 349, and the like or may have a function of generating control data and the like of a format interpretable by the mobile-machine control section 341. The internal command may include, for example, the routine operation command explained above.

The command generating section 159 of the HMD 100A generates a command corresponding to the mobile machine 310A piloted using the HMD 100A. The command corresponding to the mobile machine 310A generated by the command generating section 159 of the HMD 100A at least indicates data of a format that the mobile-machine control section 341 can receive, interpret, and process and is not limited to the internal command of the mobile machine 310A. When at least a part of the mobile machines 310A, 310B, and 310C operate according to a different command, the command generating section 159 of the HMD 100A only has to be capable of generating a command corresponding to the mobile machine 310A. The command generating section 159 of the HMD 100A may be capable of generating commands corresponding to the mobile machines 310B and 310C.

Further, the command generating section 159 may generate a command on the basis of data received from the other HMDs 100.

For example, the HMD 100A may generate a command for the mobile machine 310A according to data received from the HMD 100B and transmit the command with the HMD communication section 117. This operation is equivalent to operation of the HMD 100B for indirectly transmitting the command to the mobile machine 310A via the HMD 100A. The HMDs 100A, 100B, and 100C may be capable of mutually executing this operation. In this case, even when commands corresponding to the mobile machines 310A, 310B, and 310C are different, for example, when the mobile machines 310A, 310B, and 310C are different, the commands can be transmitted from one HMD 100 to the respective mobile machines 310.

When the command is generated by the command generating section 159 and transmitted to the mobile machine 310 by the HMD communication section 117, an encrypted command may be transmitted and received between the HMD communication section 117 and the mobile-machine communication section 343 of the mobile machine 310. For example, the HMD communication section 117 and the mobile-machine communication section 343 may be configured to transmit and receive various data including commands in a packet format. Encryption may be applied to each of packets using a random number and key information. In this case, the command generating section 159 may encrypt a command and cause the HMD communication section 117 to transmit encrypted data. In the mobile machine 310, the mobile-machine control section 341 may perform processing for decrypting the encrypted data received by the mobile-machine communication section 343. When the mobile machine 310 transmits data to the HMD 100, similarly, the mobile machine 310 may transmit, with the mobile-machine communication section 343, encrypted data encrypted by the mobile-machine control section 341. The HMD 100 may receive the encrypted data with the HMD communication section 117. The HMD control section 141 may decrypt the received encrypted data.

The HMD control section 141 communicates with the mobile machine 310 through the HMD communication section 117 and receives, with the position-information acquiring section 156, mobile machine position information transmitted by the mobile machine 310. The HMD control section 141 receives, with the image-data acquiring section 154, captured image data transmitted by the mobile machine 310. The HMD control section 141 may process the mobile machine position information received from the mobile machine 310 and generate, as new mobile machine position information, data indicating the position of the mobile machine 310 generated on the basis of the received mobile machine position information. The HMD control section 141 may process the captured image data received from the mobile machine 310 and generate new image data based on the received captured image data.

The HMD 100A can transmit mobile machine position information and captured image data of the mobile machine 310A to the HMDs 100B and 100C. In this case, the HMD control section 141 of the HMD 100A can transmit the mobile machine position information and/or the captured image data to the HMDs 100B and 100C at designated timing. Similarly, the HMD 100B can transmit mobile machine position information and captured image data of the mobile machine 310B to the HMDs 100A and 100C. The HMD 100C can transmit mobile machine position information and captured image data of the mobile machine 310C to the HMDs 100A and 100B.

In the mobile machine composite control system 1, any one of the HMDs 100A, 100B, and 100C corresponds to the first display device and the other HMDs correspond to the second display device. For example, when the HMD 100A is set as the first display device, the HMDs 100B and 100C correspond to the second display device. When the HMD 100B or 100C is set as the first display device, similarly, the HMDs 100A and 100C or the HMDs 100A and 100B correspond to the second display device. The image display section 20 of the first display device is equivalent to the first display section. The image display section 20 of the second display device is equivalent to the second display section.

The operation detecting section 157 of the first display device is equivalent to the first operation detecting section and the operation detecting section 157 of the second display device is equivalent to the second operation detecting section. The command generating section 159 of the first display device is equivalent to the first mobile-body control section and the command generating section 159 of the second display device is equivalent to the second mobile-body control section. The image-data acquiring section 154 of the first display device is equivalent to the first mobile-body-image-data acquiring section. The image-data acquiring section 154 of the second display device is equivalent to the second mobile-body-image-data acquiring section. The display control section 147 of the first display device is equivalent to the first display control section and the display control section 147 of the second display device is equivalent to the second display control section.

The mobile machines 310A, 310B, and 310C are the mobile bodies. Any one of the mobile machines 310A, 310B, and 310C corresponds to the first mobile body. The other mobile machines correspond to the second mobile body. For example, when the mobile machine 310A is set as the first mobile body, the mobile machines 310B and 310C correspond to the second mobile body. When the mobile machine 310B or 310C is set as the first mobile body, similarly, the mobile machines 310A and 310C or the mobile machines 310A and 310B correspond to the second mobile body.

The same applies to a correspondence relation between the first display device and the first mobile body and a correspondence relation between the second display device and the second mobile body. When the HMD 100A is the first display device, the mobile machine 310A corresponds to the first mobile body. When the HMD 100A is the second display device, the mobile machine 310A corresponds to the second mobile body. The same applies to the HMDs 100B and 100C and the mobile machines 310B and 310C.

FIGS. 9, 10, 11, 12, and 13 are flowcharts for explaining the operations of the sections of the mobile machine composite control system 1. FIGS. 14, 15, 16, and 17 are diagrams showing display examples of screens displayed on the image display section 20 according to the operation of the mobile machine composite control system 1. The operation of the mobile machine composite control system 1 is explained with reference to the figures.

Figure 9:
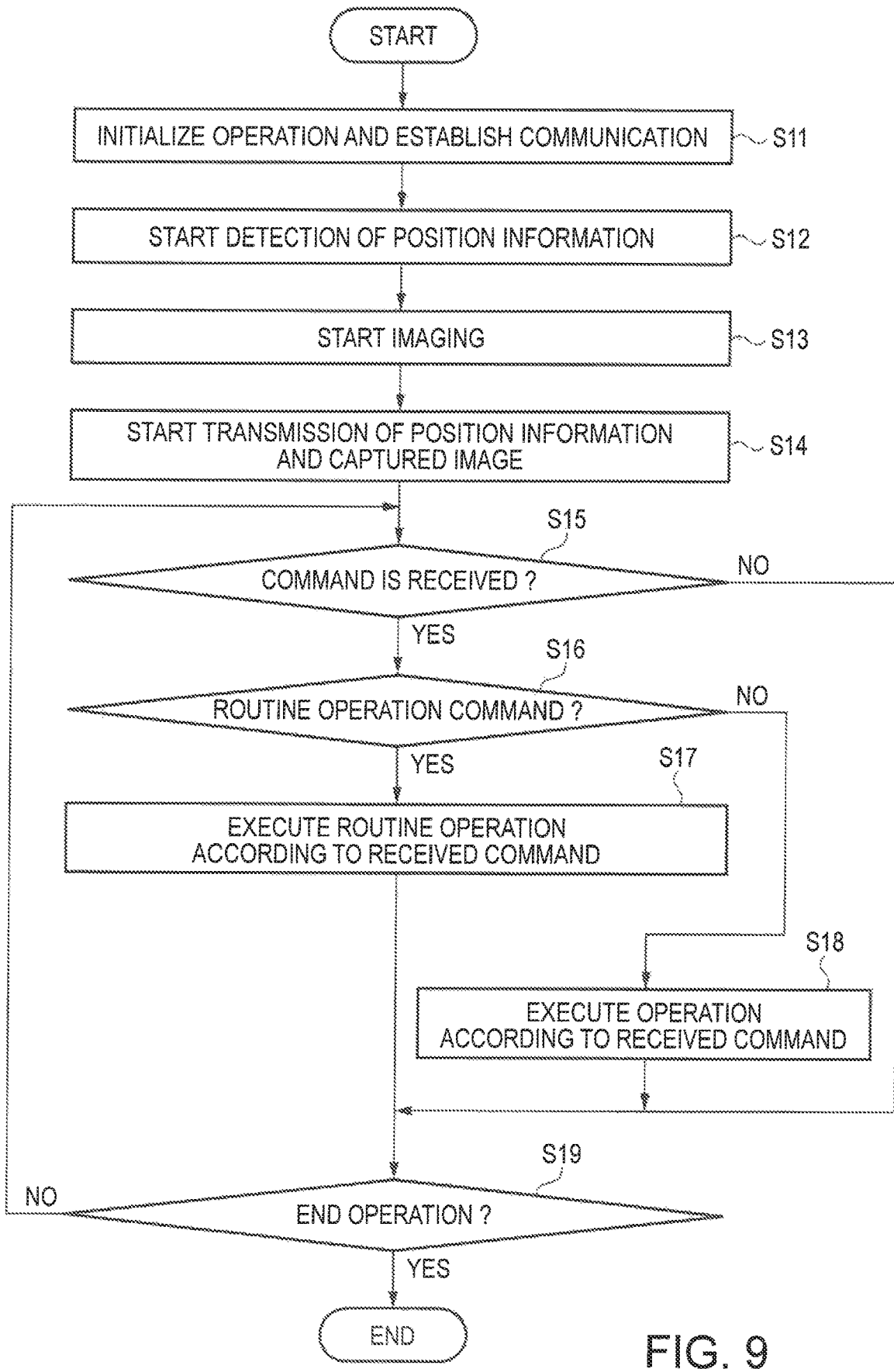
FIG. 9 is a flowchart for explaining the operation of the mobile machine.

FIG. 9 is a flowchart for explaining the operation of the mobile machine 310. The operation shown in FIG. 9 is common to the mobile machines 310A, 310B, and 310C. The mobile machines 310A, 310B, and 310C respectively execute the operation shown in FIG. 9 according to commands transmitted from the HMDs 100A, 100B, and 100C. The operation is explained with reference to the mobile machine 310A as an example.

When a power supply of the mobile machine 310A is turned on, the mobile-machine control section 341 of the mobile machine 310A starts the operation and executes initialization of the sections including the motor controller 347 and operation for establishing communication between the mobile machine 310A and the HMD 100A (step S11).

The mobile-machine control section 341 starts position detection by the GPS device 344 and starts acquisition of position information detected by the GPS device 344 (step S12). The mobile-machine control section 341 controls the camera control section 346 to start imaging by the mobile machine camera 335 (step S13).

The mobile-machine control section 341 starts processing for transmitting the position information acquired from the GPS device 344 and captured image data of the mobile machine camera 335 to the HMD 100A (step S14). The mobile-machine control section 341 may include, in the position information, a detection value of the posture sensor 348 and transmit the detection value. The mobile-machine control section 341 may include, in the position information, control information including, for example, remaining battery power of the mobile machine 310 and transmit the control information. In an operation example shown in FIG. 9, the mobile-machine control section 341 continuously executes the transmission of the position information and the captured image data at a preset cycle after step S14.

The mobile-machine control section 341 determines whether a command is received from the HMD 100A by the mobile-machine communication section 343 (step S15). When the command is received (Yes in step S15), the mobile-machine control section 341 determines whether the received command is a routine operation command (step S16). When the received command is the routine operation command (Yes in step S16), the mobile-machine control section 341 causes the flight control section 345 to execute a routine operation designated by the received command (step S17) and shifts to step S19. When the received command is not the routine operation command (No in step S16), the mobile-machine control section 341 causes the flight control section 345 to execute operation designated by the received command (step S18) and shifts to step S19. When a command is not received from the HMD 100A (No in step S15), the mobile-machine control section 341 shifts to step S19.

In step S19, the mobile-machine control section 341 determines whether to end the operation (step S19). When not ending the operation (No in step S19), the mobile-machine control section 341 returns to step S15.

The mobile machine 310B and the mobile machine 310C execute the operation shown in FIG. 9 in the same manner as the mobile machine 310A and respectively execute communication with the HMDs 100B and 100C. Consequently, the mobile machine 310B operates according to a command transmitted by the HMD 100B and transmits captured image data and position information to the HMD 100B. The same applies to the mobile machine 310C and the HMD 100C.

Figure 10:
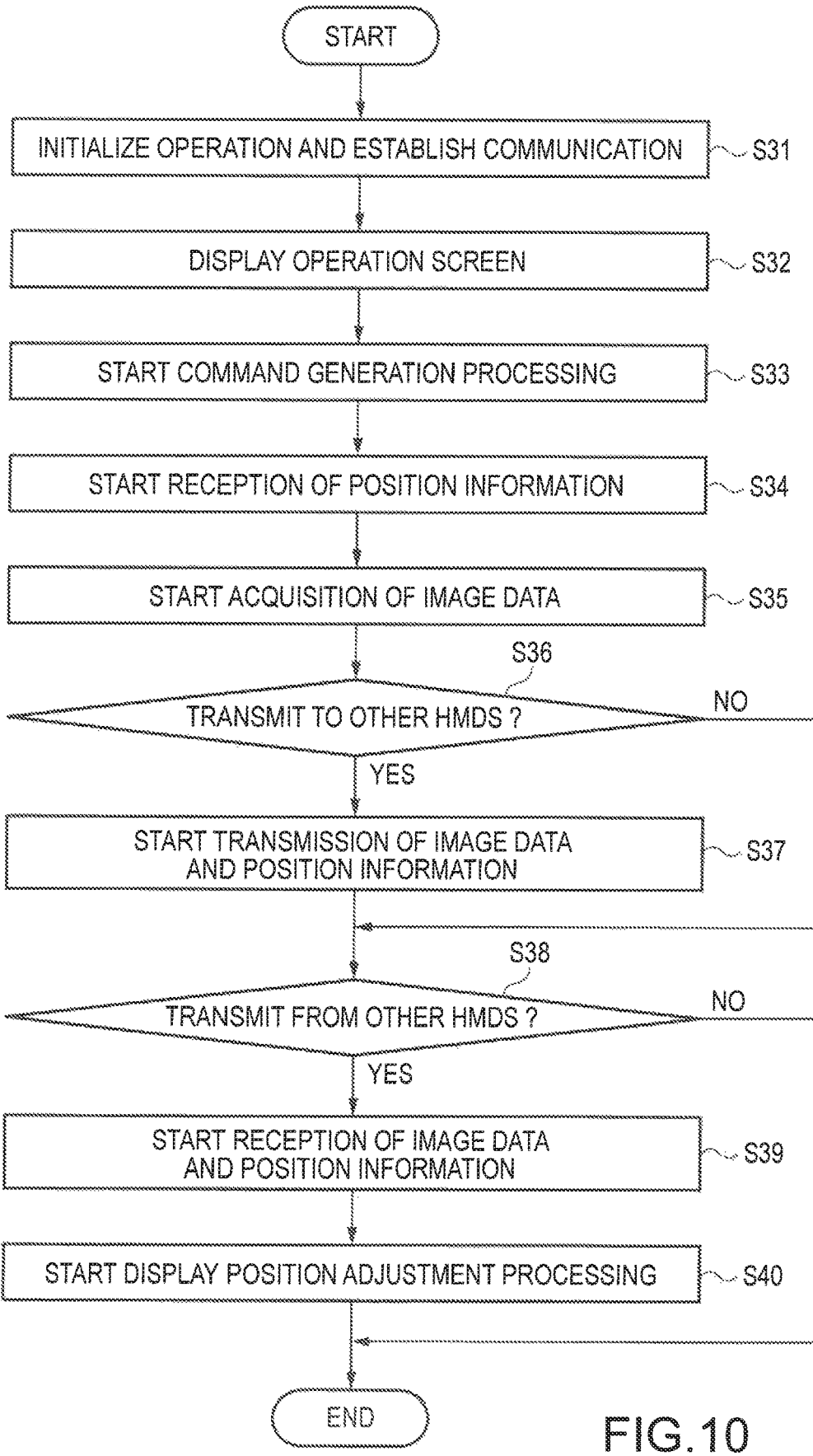
FIG. 10 is a flowchart for explaining the operation of the HMD.

FIG. 10 is a flowchart for explaining the operation of the HMD 100. The operation shown in FIG. 10 is common to the HMDs 100A, 100B, and 100C. The operation is explained with reference to the HMD 100A as an example.

The HMD control section 141 of the HMD 100A starts the operation when the power supply of the HMD 100A is turned on, performs initialization of the sections of the HMD 100A, and establishes communication between the HMD 100A and the mobile machine 310A (step S31).

The HMD control section 141 causes the image display section 20 to display an operation screen (a screen for operation) for performing operation for piloting the mobile machine 310A (step S32) and starts command generation processing (step S33). The command generation processing is processing for detecting operation with the operation detecting section 157 in a state in which the operation screen is displayed on the image display section 20, generating, on the basis of the detected operation, with the command generating section 159, a command for driving the mobile machine 310A, and transmitting the command. The HMD control section 141 can generate and transmit a command according to operation by the user from the start of the command generation processing in step S33 until the end of the operation of the HMD control section 141. The operation detected by the operation detecting section 157 in the command generation processing is, as explained above, the operation in the control device 10 such as the touch operation of the track pad 14, the operation by the pointer in the imaging range of the HMD camera 61, and the like. An example of the operation by the pointer is explained below with reference to FIG. 15.

The HMD control section 141 starts operation for receiving position information from the mobile machine 310A (step S34). The HMD control section 141 starts acquisition of image data (step S35). The image data acquired in step S35 may be captured image data of the mobile machine 310A or may be captured image data of the other mobile machines 310B and 310C.

The HMD control section 141 determines whether to transmit the position information started to be received in step S34 and the image data started to be acquired in step S35 to the other HMDs 100 (step S36). Necessity of the transmission is set in the HMD control section 141 in advance and determined by, for example, a set value included in the setting data 171. A specific transmission destination is at least either one of the HMD 100B and the HMD 100C. The HMD control section 141 performs communication with the other HMDs 100, that is, the HMDs 100B and 100C. When requested to transmit data, the HMD control section 141 may determine to transmit data.

When transmitting the data to the HMD 100B or the HMD 100C (Yes in step S36), the HMD control section 141 starts data transmission of the image data and the position information (step S37). If the HMD 100B executes the operation shown in FIG. 10, in step S37, the HMD control section 141 starts the data transmission to the HMDs 100A and 100C. If the HMD 100C executes the operation shown in FIG. 10, in step S37, the HMD control section 141 starts the data transmission to the HMDs 100A and 100B.

Thereafter, the HMD control section 141 determines whether to receive data from the other HMDs 100 (step S38). Necessity of the reception is set in the HMD control section 141 in advance and determined by, for example, a set value included in the setting data 171. A specific transmission source is at least either one of the HMD 100B and the HMD 100C. The HMD control section 141 may perform communication with the other HMDs 100, that is, the HMDs 100B and 100C. When requested to receive data, the HMD control section 141 may determine to receive the data. When determining not to transmit the data to the HMD 100B or the HMD 100C (No in step S36), the HMD control section 141 shifts to step S38.

When receiving data from the HMD 100B or the HMD 100C (Yes in step S38), the HMD control section 141 starts reception of image data and data of position information (step S39). If the HMD 100B executes the operation shown in FIG. 10, in step S39, the HMD control section 141 starts data reception from the HMDs 100A and 100C. If the HMD 100C executes the operation shown in FIG. 10, in step S39, the HMD control section 141 starts data reception from the HMDs 100A and 100B.

The HMD control section 141 starts display position adjustment processing for determining a display position and size of the image data (step S40) and ends the processing. When determining not to receive data from the other HMDs 100 (No in step S38), the HMD control section 141 executes the operation in step S40 and ends the processing.

Display forms of the HMDs 100A, 100B, and 100C are explained.

Figure 14:
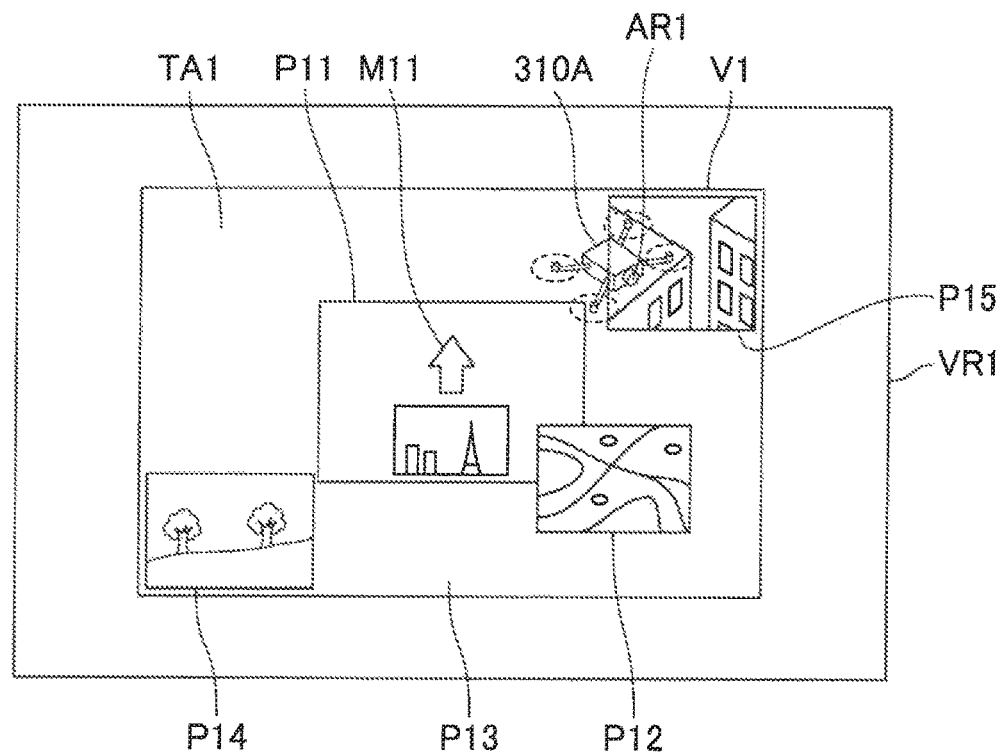
FIG. 14 is a diagram showing a display example of the HMD.

FIG. 14 is a diagram showing a display example of the HMD 100A.

In the figure, a sign VR1 indicates a field of view of the user wearing the image display section 20 of the HMD 100A. A sign V1 indicates a region where it is possible to cause the user to visually recognize an image with the half mirrors 261 and 281, in other words, a displayable region where the image display section 20 can display an image. The field of view VR1 indicates a range visually recognized by the user with the external light OL transmitted through the image display section 20 and the image light L output by the image display section 20. In the example shown in FIG. 14, the mobile machine 310A in the real space is visually recognized in a position overlapping the display region V1.

An image P11 functioning as an operation screen is displayed in the center of the display region V1. The image P11 is a screen for piloting the mobile machine 310A according to operation by the user. For example, display based on position information received by the HMD 100A from the mobile machine 310A is performed. Specifically, the latitude, the longitude, the altitude, the remaining battery power, and the like of the mobile machine 310A are displayed.

When transmitting a command to the mobile machine 310A according to operation by the user, the HMD control section 141 displays content of the transmitted command on the image P11. For example, in FIG. 14, an operation indication M11 indicating that a command for instructing an advance is transmitted to the mobile machine 310A is displayed on the image P11. The display of content of the command may be an image like the operation indication M11 or characters, a figure, or other display objects can be used.

An image P12 indicating the position of the mobile machine 310A is displayed in the display region V1. As the image P12, an image indicating the position of the mobile machine 310A is displayed together with a map. The position of the HMD 100A may be displayed on the map of the image P12. On the map of the image P12, the positions of the mobile machines 310B and 310C may be displayed and the positions of the HMDs 100B and 100C may be displayed. The HMD 100A can display these positions on the basis of position information received by the HMD 100A from the HMDs 100B and 100C. As the map displayed on the image P12, a bird's-eye view map may be used. Specifically, the map may be a display form functioning as a navigation map corresponding to a situation in which the mobile machine 310A is flying.

In the display region V1, images P13, P14, and P15 received by the HMD 100A from the mobile machine 310A and the HMDs 100B and 100C are displayed. The image P13 is an image displayed on the basis of captured image data received from the mobile machine 310A. The image P14 is an image displayed on the basis of image data received by the HMD 100A from the HMD 100B. Specifically, the image P14 is an image based on captured image data of the mobile machine 310B received by the HMD 100B from the mobile machine 310B or an image based on captured image data of the HMD camera 61 included in the HMD 100B. The image P15 is an image displayed on the basis of image data received by the HMD 100A from the HMD 100C. Specifically, the image P15 is an image based on captured image data of the mobile machine 310C received by the HMD 100C from the mobile machine 310C or an image based on captured image data of the HMD camera 61 included in the HMD 100C.

In the display region V1, an image AR1 indicating an operation state of the mobile machine 310A is displayed. The image AR1 is an image indicating a traveling direction (an advance, a retraction, a turn, a reverse turn, etc.) of the mobile machine 310A. In this embodiment, the image AR1 simulating light emission of the indicator 349 (FIG. 2) included in the mobile machine 310A is displayed. A display position of the image AR1 is a position overlapping a position where the mobile machine 310A in the real space is visually recognized. That is, the image AR1 is so-called augmented reality (AR) display that affects the visibility of the mobile machine 310A in the real space and additionally displays information.

Consequently, even when the user cannot directly visually recognize the indicator 349 of the mobile machine 310A, the user can grasp an operation state of the mobile machine 310A in the same manner as when the user can directly visually recognize the indicator 349. Therefore, the user can learn the traveling direction of the mobile machine 310A. In display regions V2 and V3, the same image as the image AR1 may be displayed during the display of the operation screen or in a state in which the mobile machines 310B and 310C in the real space can be visually recognized. When the mobile machines 310B and 310C in the real space are visually recognized in positions overlapping the display region V1, the HMD control section 141 of the HMD 100A may display the same image as the image AR1 in the positions where the mobile machines 310B and 310C are visually recognized.

Figure 15:
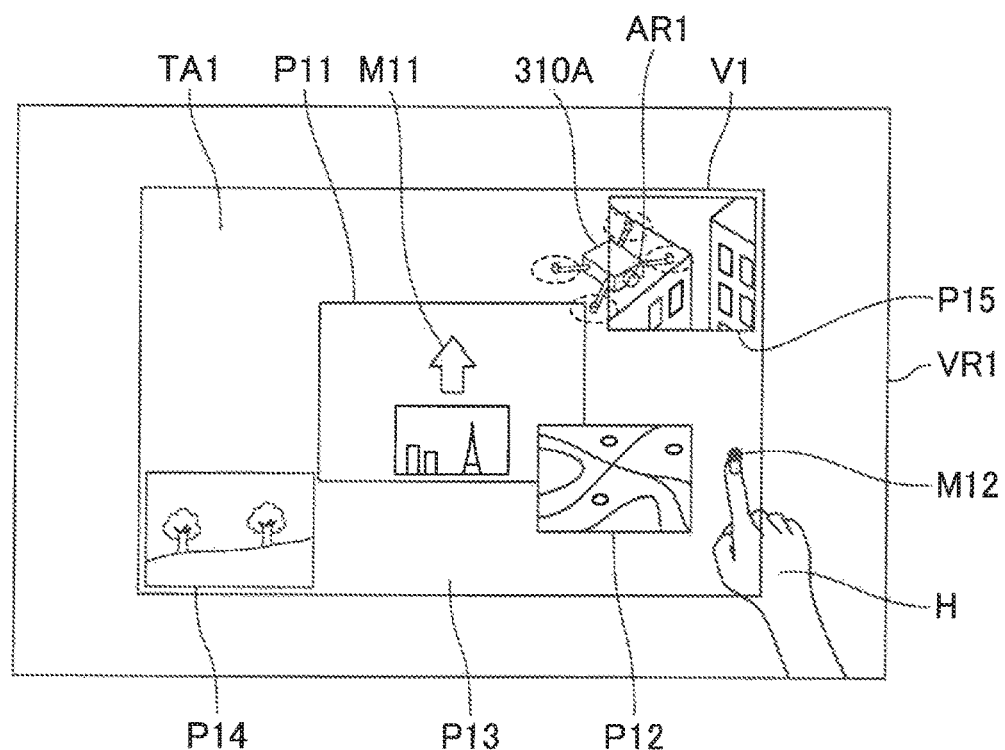
FIG. 15 is a diagram showing a display example of the HMD.

FIG. 15 is a diagram showing a display example of the HMD 100A including another example of the operation screen.

In the display example shown in FIG. 15, an example is shown in which operation by the pointer H is performed in a state in which the mobile machine 310A in the real space is visually recognized in the field of view VR1. The pointer H is a hand of the user in the example shown in FIG. 15. However, the pointer H only has to be an electronic device incorporating a light emission circuit, a pointing stick, a pen, or other various objects, which can be imaged by the HMD camera 61. The HMD control section 141 acquires captured image data of the HMD camera 61 with the imaging control section 149. The operation detecting section 157 analyzes the captured image data to detect the pointer H. The operation detecting section 157 specifies a relative position of the pointer H with respect to the image display section 20 to thereby specify a position of the pointer H with respect to the field of view VR1. This position is detected as an operation position by the pointer H. The HMD control section 141 causes the image display section 20 to display, in a display position inside the display region V1 corresponding to the operation position, an operation image M12 indicating that operation by the pointer H is detected. The operation image M12 is an image for notifying the operation position detected by the HMD control section 141 to the user. Further, the HMD control section 141 causes, on the basis of the position of the pointer H detected by the operation detecting section 157, the command generating section 159 to generate a command transmitted to the mobile machine 310 and causes the HMD communication section 117 to transmit the command to the mobile machine 310. Calibration may be executed in advance concerning the position of the pointer H. The HMD 100 may store calibration data including a result of the calibration. In this case, position alignment of the pointer H can be specified according to the calibration data. That is, the user wearing the image display section 20 can instruct driving of the mobile machine 310 by moving the pointer H. The HMD 100 provides a so-called action UI (User Interface). Operation of the action UI by the pointer H is equivalent to the position indicating operation. That is, the position indicating operation is operation for positioning the pointer H in the imaging range of the HMD camera 61 or moving the pointer H in the imaging range. The operation detecting section 157 not only detects the position of the pointer H as the indicating position as in the example shown in FIG. 15. The operation detecting section 157 may realize a gesture UI in which, when the pointer H moves in the imaging range of the HMD camera 61, if the movement corresponds to a gesture set in advance, the operation detecting section 157 detects the movement. If the operation detecting section 157 detects the position or the movement of the pointer H on the basis of a captured image of the HMD camera 61, the position indicating operation is detected. In this way, the operation detected by the operation detecting section 157 is not limited to the operation on the track pad 14 or the like, which is the operation section of the control device 10. Operation by the pointerH and operation by the position, the posture, the movement, and the like of the image display section 20 can be included in the operation. The operation detected by the operation detecting section 157 may be applied to not only the operation by the user who uses the HMD 100 in order to pilot the mobile machine 310 but also, for example, control of display of the HMD 100B operated by a user of the HMD 100B when the user of the HMD 100A pilots the mobile machine 310A.

Figure 16:
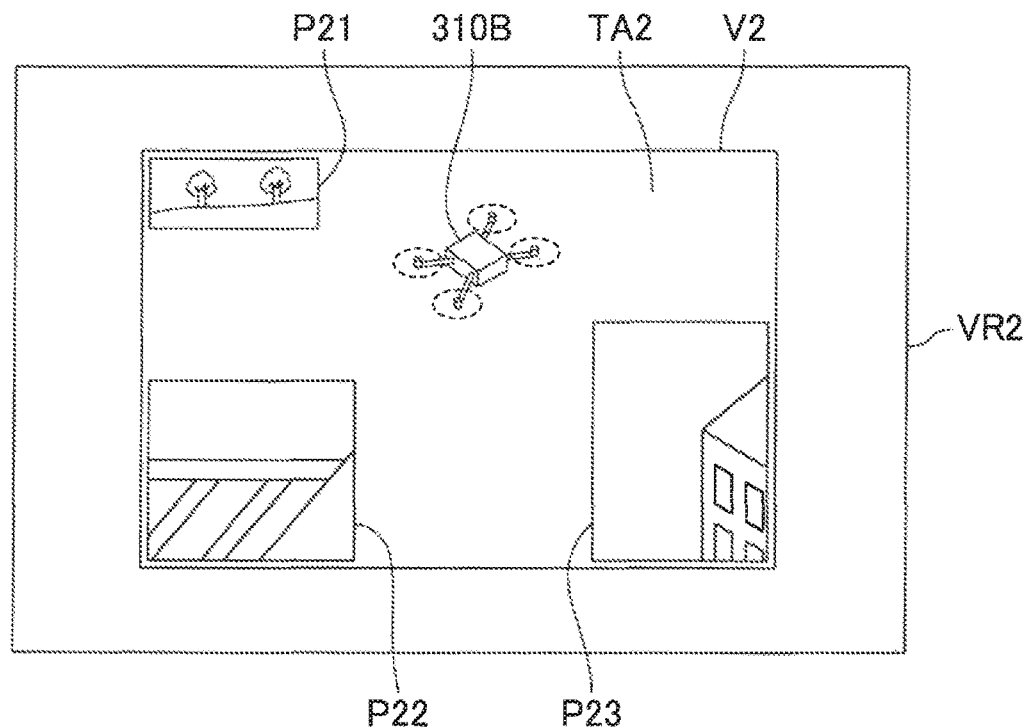
FIG. 16 is a diagram showing a display example of the HMD.

FIG. 16 is a diagram showing a display example of the HMD 100B.

In the figure, a sign VR2 indicates a field of view of the user wearing the image display section 20 of the HMD 100A. A sign V2 indicates a region where it is possible to cause the user to visually recognize an image with the harf mirrors 261 and 281, in other words, a displayable region where the image display section 20 can display an image. The field of view VR2 indicates a range visually recognized by the user with the external light OL transmitted through the image display section 20 and the image light L output by the image display section 20. In the example shown in FIG. 16, the mobile machine 310B in the real space is visually recognized in a position overlapping the display region V2.

In the display region V2, for example, display based on position information received by the HMD 100B from the mobile machine 310B may be performed. Specifically, the latitude, the longitude, the altitude, the remaining battery power, and the like of the mobile machine 310B may be displayed.

In the display region V2, images P21, P22, and P23 received by the HMD 100B from the mobile machines 310B and the HMDs 100A and 100C are displayed. The image P21 is an image displayed on the basis of captured image data received from the mobile machine 310B. The image P22 is an image displayed on the basis of image data received by the HMD 100B from the HMD 100A. Specifically, the image P22 is an image based on captured image data of the mobile machine 310A received by the HMD 100A from the mobile machine 310A or an image based on captured image data of the HMD camera 61 included in the HMD 100A. The image P23 is an image displayed on the basis of image data received by the HMD 100B from the HMD 100C. Specifically, the image P23 is an image based on captured image data of the mobile machine 310C received by the HMD 100C from the mobile machine 310C or an image based on captured image data of the HMD camera 61 included in the HMD 100C.

Figure 17:
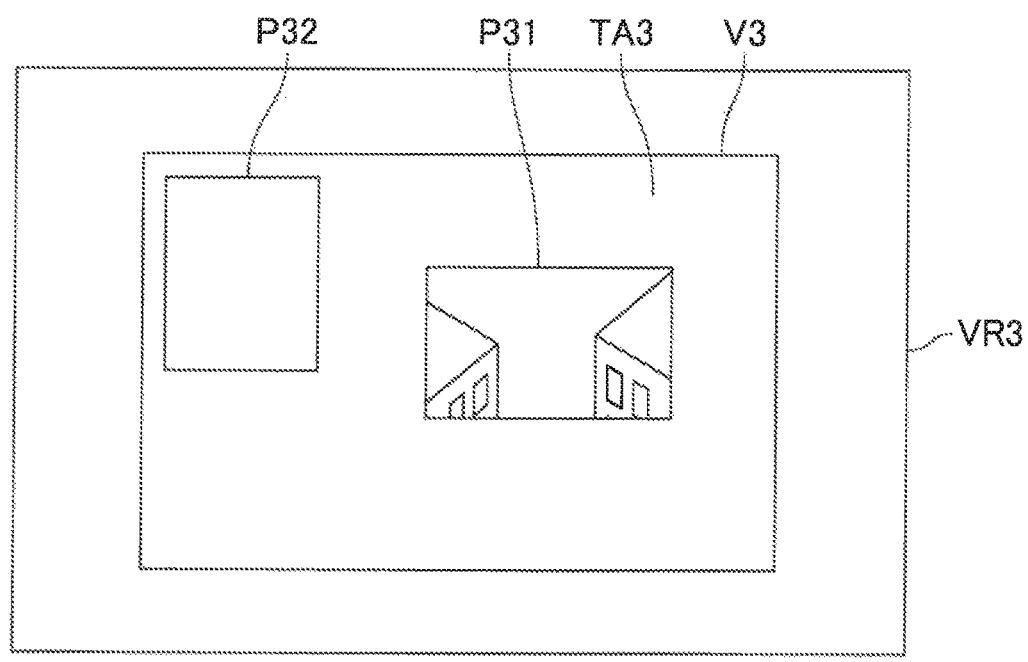
FIG. 17 is a diagram showing a display example of the HMD.

FIG. 17 is a diagram showing a display example of the HMD 100C.

In the figure, a sign VR3 indicates a field of view of the user wearing the image display section 20 of the HMD 100A. A sign V3 indicates a region where it is possible to cause the user to visually recognize an image with the half mirrors 261 and 281, in other words, a displayable region where the image display section 20 can display an image. The field of view VR3 indicates a range visually recognized by the user with the external light OL transmitted through the image display section 20 and the image light L output by the image display section 20.

In the example shown in FIG. 17, a scene in the real space, that is, an outside scene is visually recognized through the image display section 20 in a position overlapping the display region V3 as well.

In the display region V3, for example, display based on position information received by the HMD 100C from the mobile machine 310C may be performed. Specifically, the latitude, the longitude, the altitude, the remaining battery power, and the like of the mobile machine 310C may be displayed.

In the display region V3, images P31 and P32 received by the HMD 100C from the mobile machine 310C and the HMDs 100A and 100B are displayed. The image P31 is an image displayed on the basis of captured image data received from the mobile machine 310C. The image P32 is an image displayed on the basis of image data received by the HMD 100C from the HMD 100A or the HMD 100B. Specifically, the image P32 may be an image based on captured image data of the mobile machine 310A received by the HMD 100A from the mobile machine 310A or an image based on captured image data of the HMD camera 61 included in the HMD 100A. Alternatively, the image P32 may be an image based on captured image data of the mobile machine 310B received by the HMD 100B from the mobile machine 310B or an image based on captured image data of the HMD camera 61 included in the HMD 100B.

In the display region V2 shown in FIG. 16, the HMD 100B may display an operation screen for piloting the mobile machine 310B. In the display region V3 shown in FIG. 17, the HMD 100C may display an operation screen for piloting the mobile machine 310C.

The user of the HMD 100A views the images P11 to P15 and the operation indication M11 displayed in the display region V1 shown in FIG. 14 while visually recognizing the mobile machine 310A in the real space. For example, when piloting of an unmanned aerial vehicle such as the mobile machine 310A is regulated by laws, ordinances, and other rules to perform the piloting in a visually recognizable range, the user needs to be able to visually recognize the mobile machine 310A in the real space. On the other hand, importance of visual recognition of the images P11 to P15 by the user is not low. For example, when the HMD 100B transmits captured image data of the mobile machine 310B, the user of the HMD 100A can learn the position and the direction of the mobile machine 310B by visually recognizing the image P14. The user can obtain a lot of information concerning an imaging target object imaged by the mobile machine 310B. For example, when the mobile machines 310B and 310C fly in positions away from the user of the HMD 100A, it is possible to realize provision of information concerning a congested road, guidance of a bypass, provision of information concerning various disaster sites including fire, and information sharing using images based on captured image data of the mobile machines 310B and 310C. Note that, in the display examples shown in FIGS. 14 to 17, in order to identify a device that captures a displayed image, a frame may be displayed on the image and a display state (a solid line or a broken line, a display color, etc.) of the frame may be changed for each of device models.

The HMD control section 141 of the HMD 100A performs processing for controlling visibility concerning each of the images P11 to P15 displayed in the display region V1. The processing is shown in FIG. 11.

Figure 11:
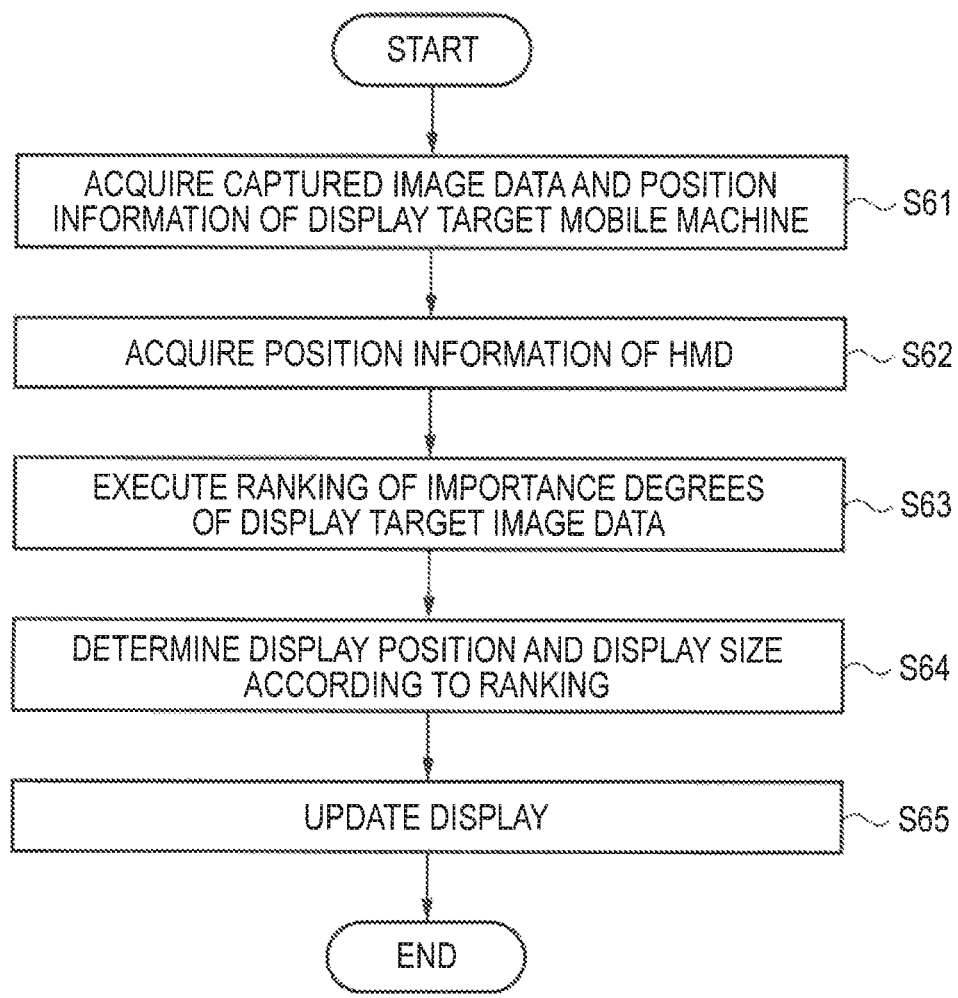
FIG. 11 is a flowchart for explaining the operation of the HMD.

FIG. 11 is a flowchart for explaining the operation of the HMD 100. The operation shown in FIG. 11 is common to the HMDs 100A, 100B, and 100C. However, the operation is explained with reference to the HMD 100A as an example.

The HMD control section 141 of the HMD 100A acquires captured image data and position information received from the mobile machine 310, which is a display target, that is, the mobile machine 310A (step S61). The captured image data and the position information acquired in step S61 is, for example, the captured image data and the position information received in the processing shown in FIG. 10. However, the captured image data and the position information may be received from the HMDs 100B and 100C.

The HMD control section 141 acquires position information of the HMD 100A (step S62). In step S62, the HMD control section 141 acquires, for example, position information detected by the GPS 115 (FIG. 7). However, the position information only has to be information capable of specifying the position of the HMD 100A.

The HMD control section 141 performs, on the basis of the information acquired in steps S61 and S62, ranking of importance degrees with respect to image data related to images displayed in the display region V1 (step S63). The HMD control section 141 determines display positions and display sizes of the images based on the image data according to the ranking of the importance degrees determined in step S63 (step S64), updates the display (step S65), and ends the processing.

In step S62, the HMD control section 141 ranks, on the basis of the position of the mobile machine 310A and the position of the HMD 100A, importance degrees of the outside scene, the captured image data of the mobile machine 310A, and the operation screen for piloting the mobile machine 310A. For example, when the rank of the importance degree of the operation screen (the image P11 shown in FIG. 14) is high, the HMD control section 141 performs processing to set the visibility of the operation screen higher than the visibilities of the outside scene and the captured image data. That is, the HMD control section 141 may perform highlighted display through enlarged display, blinking, or the like of the operation screen. In order to reduce the light amount of the external light OL, the HMD control section 141 may reduce transmitted light amounts of the right electronic shade 227 and the left electronic shade 247. The HMD control section 141 may increase the luminance of the operation screen to set the visibility of the operation screen higher than the visibility of the outside scene. In this processing, the HMD control section 141 may perform control according to an external environment obtained from the detection value of the illuminance sensor 65 and the captured image data of the HMD camera 61. As an example, the HMD control section 141 may control an image in the display region V1 according to a back ground of the place of the HMD 100A, that is, a real background (fine weather, rain, evening, night, snow, sea, autumn tints, etc.) affected by weather and time. The HMD control section 141 may adjust a color or a color tone of the operation screen and automatically adjust the operation screen to be capable of maintaining a state distinguishable from sky, clouds, or scenery of the background. When the operation screen looks dark, the HMD control section 141 may add a watermark or a background having a bright color (white, etc.) to the operation screen.

Further, when performing the ranking, the HMD control section 141 may change the ranking according to a positional relation among the positions of the other mobile machines, that is, the mobile machines 310B and 310C, the position of the mobile machine 310A, and the position of the HMD 100A.

Concerning the control of the display positions of the image based on the captured image data of the mobile machine 310A, the operation screen for piloting the mobile machine 310A, the other images, and the like, the HMD control section 141 may use detection values of various sensors included in the HMD 100A. For example, the HMD control section 141 may control the display positions using a detection value concerning the position of the image display section 20. Specifically, with the operation detecting section 157, the HMD control section 141 may detect a movement of the image display section 20 on the basis of detection values of the six-axis sensor 235 and/or the magnetic sensor 237 and detect the movement of the image display section 20 and a posture of the user as operation. The operation detecting section 157 may detect the movement of the image display section 20 and the posture of the user on the basis of a change in a captured image of the HMD camera 61 and a change in a detection value of the distance sensors 64. The operation detecting section 157 may detect, as operation, movements and line of sight directions of the right eye RE and/or the left eye LE imaged by the inner cameras 68. With the function of the display control section 147, the HMD control section 141 may determine priority of a displayed image according to the operation detected by the operation detecting section 157 and determine a display position. The HMD control section 141 may control display positions and sizes of display areas of images based on captured image data, transmittances of a captured image and an outside scene, transmittance of the display UI for control, and the like in the HMD 100A, which is the first display device, and the HMDs 100B and 100C, which are the second display devices. As an example, when the line of sight of the user or the direction of the head of the user wearing the image display section 20 faces the mobile machine 310, which is a target of operation, the HMD control section 141 may change the transmittances of the displayed image and the UI for operation such that the user can preferentially visually recognize the outside scene (the real space) visually recognized through the display region V1. The HMD control section 141 may perform these kinds of control with an operation state of the mobile machine 310 reflected on the control. For example, when the mobile machine 310 takes off and lands, if the mobile machine 310 is located in a position close to the user, it is possible to extinguish the display of the image based on the captured image data of the mobile machine camera 335 and improve the priority of the display of an image for piloting for operating the mobile machine 310. Furthermore, when a sudden movement of the head wearing the image display section 20 or sudden fluctuation in a line of sight direction of the right eye RE or the left eye LE is detected by the operation detecting section 157, the HMD control section 141 may determine that the detection corresponds to occurrence of a priority matter of viewing the outside scene near the user, specifically, determine that the user is walking. In such a case, the HMD control section 141 may retract the display of the image based on the captured image data of the mobile machine camera 335 and the image for piloting of the mobile machine 310 from the center to the periphery of the field of view VR1 and reduce the display luminance (the brightness) of the images to control the images to set the visibility of the outside scene higher than the visibility of these images.

Figure 12:
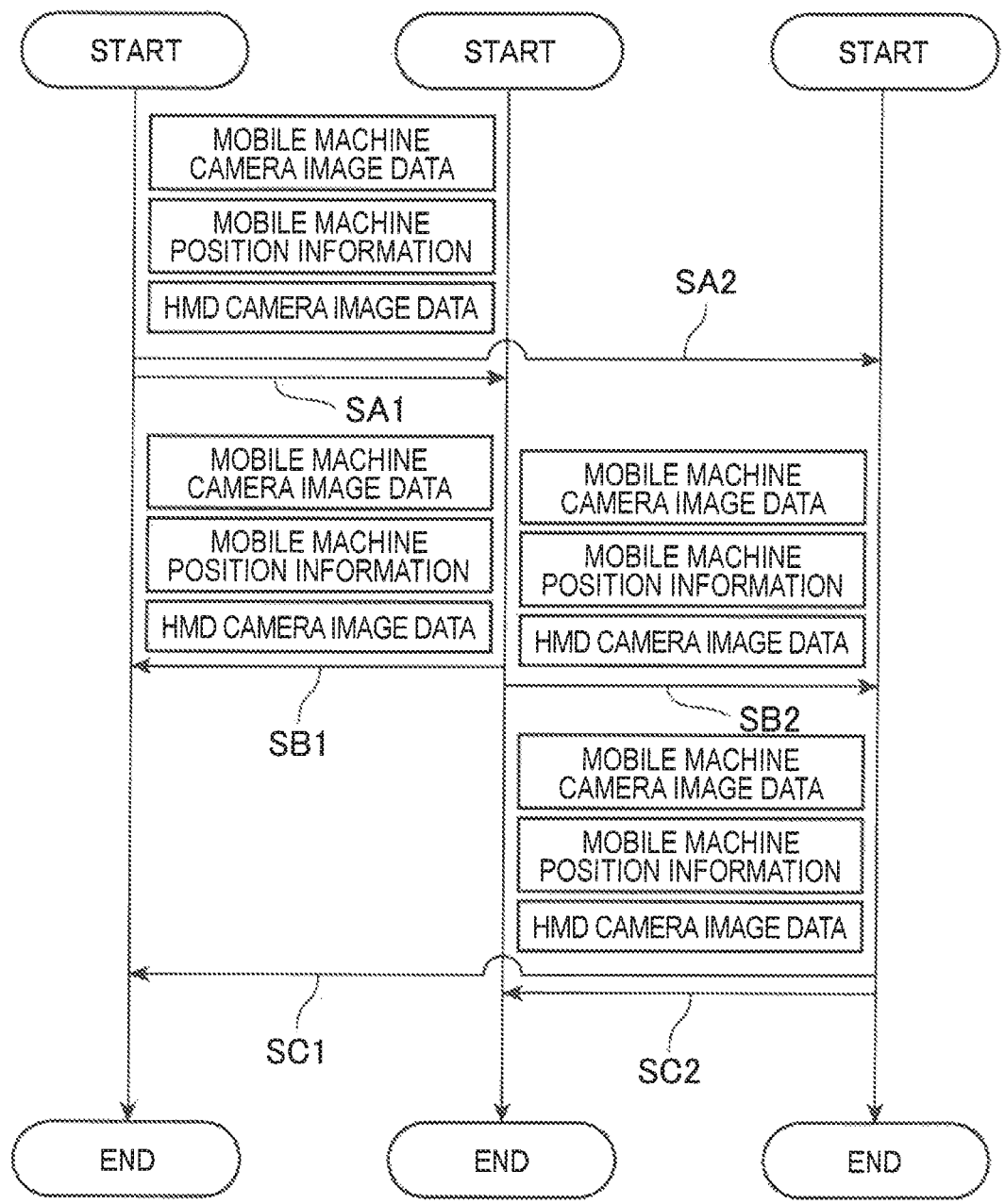
FIG. 12 is a sequence chart showing operation related to transmission and reception of data among HMDs.

FIG. 12 is a sequence chart showing operation related to transmission and reception of data among the HMDs 100A, 100B, and 100C.

In the mobile machine composite control system 1, the HMDs 100A, 100B, and 100C are capable of mutually transmitting and receiving data.

Specifically, the HMD 100A can transmit captured image data (mobile machine camera image data) of the mobile machine 310A, position information (mobile machine position information) of the mobile machine 310A, and captured image data (HMD camera image data) of the HMD camera 61. The HMD 100A can perform both of operation for transmitting the data to the HMD 100B (step SA1) and operation for transmitting the data to the HMD 100C (step SA2).

Similarly, the HMD 100B can transmit mobile machine camera image data of the mobile machine 310B, mobile machine position information of the mobile machine 310B, and HMD camera image data captured by the HMD 100B. As a transmission destination, both of the HMD 100A (step SB1) and the HMD 100C (step SB2) can be selected. The HMD 100C can transmit mobile machine camera image data of the mobile machine 310C, mobile machine position information of the mobile machine 310C, and HMD camera image data captured by the HMD 100C. As a transmission destination, both of the HMD 100A (step SC1) and the HMD 100B (step SC2) can be selected.

In this way, in the mobile machine composite control system 1, the HMDs 100A, 100B, and 100C can mutually transmit and receive data and mutually acquire captured image data and position information of the mobile machines 310A, 310B, and 310C. It is possible to perform alternation (handover) of the piloting of the mobile machine 310 making use of this configuration.

For example, the mobile machine 310A moves to an A point according to the piloting by the HMD 100A and executes hovering at the A point. The HMD 100B communicates with the HMD 100A. The HMD 100B and the HMD 100A mutually perform authentication. After succeeding in the authentication, the HMD 100A transmits data for identifying the HMD 100B to the mobile machine 310A. The mobile machine 310A communicates and performs authentication with the HMD 100B on the basis of the data. Thereafter, the mobile machine 310A shifts from a state in which the mobile machine 310A performs the hovering at the A point to a state in which the mobile machine 310A moves according to a command transmitted by the HMD 100B. According to this procedure, it is possible to hand over the piloting of the mobile machine 310A from the user of the HMD 100A to the user of the HMD 100B. Before and after the handover, an image based on captured image data of the mobile machine 310A displayed by the HMDs 100A and 100B or an AR image displayed over the mobile machine 310A in the real space may be changed. A display color of the AR display or a color of a display frame of the image based on the captured image data may be changed between during piloting of the mobile machine 310A by the HMD 100A and during piloting of the mobile machine 310A by the HMD 100B.

Figure 13:
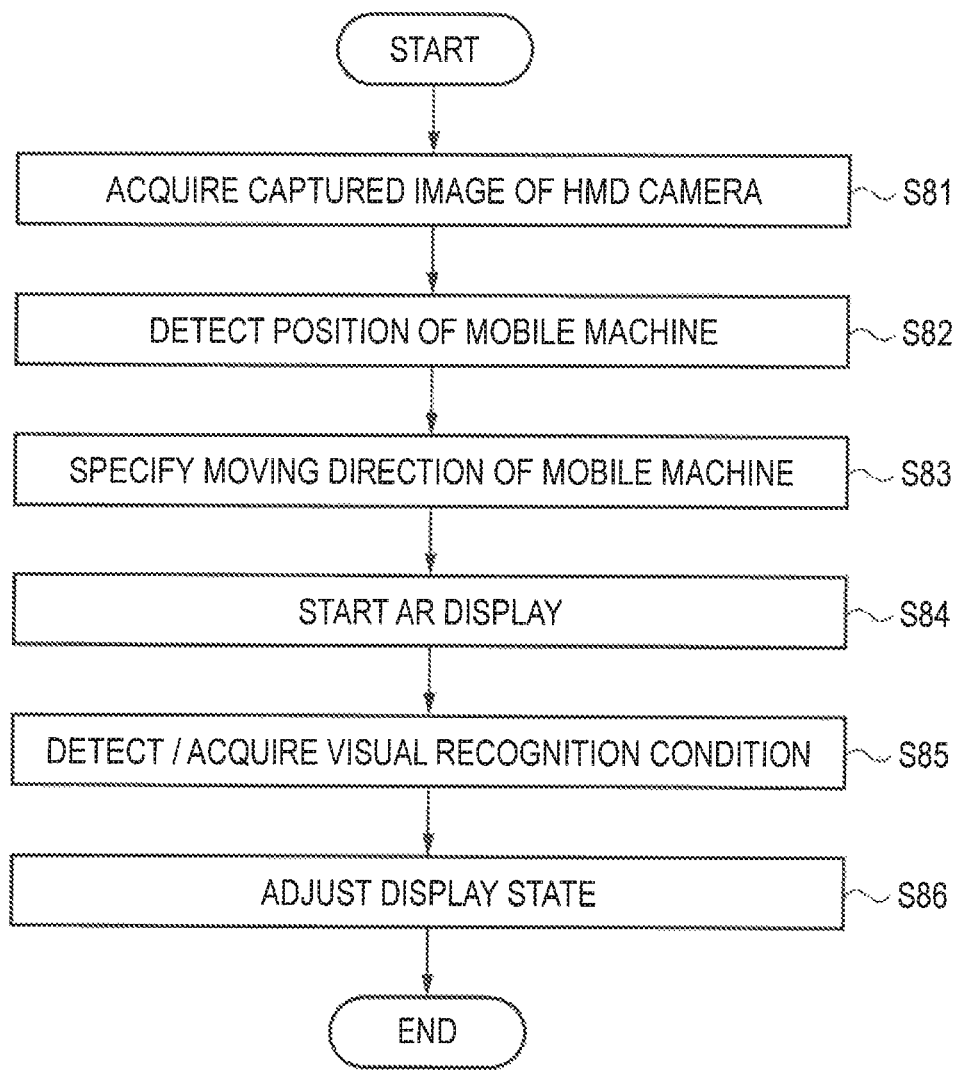
FIG. 13 is a flowchart for explaining the operation of the HMD.

FIG. 13 is a flowchart for explaining the operation of the HMD 100.

The operation shown in FIG. 13 is operation concerning display of an AR image (e.g., the image AR1 shown in FIG. 14 displayed by the HMD 100A) corresponding to the mobile machine 310. The HMDs 100B and 100C may execute the operation shown in FIG. 13. An example is explained in which the HMD 100A executes the operation.

The HMD control section 141 of the HMD 100A acquires captured image data of the HMD camera 61 (step S81). The HMD control section 141 extracts an image of the mobile machine 310A from the captured image data and detects relative positions of the extracted image and the display region V1 (step S82). The detected position is equivalent to a position of the mobile machine 310A with respect to the field of view VR1 transmitted through the image display section 20 and is a condition for determining a display position of the image AR1.

The HMD control section 141 specifies a moving direction of the mobile machine 310A (step S83). The moving direction of the mobile machine 310A can be specified on the basis of a command transmitted to the mobile machine 310A by the HMD 100A, position information transmitted to the HMD 100A by the mobile machine 310A, and the like.

The HMD control section 141 generates, on the basis of the specified moving direction, the image AR1 corresponding to the display of the indicator 349 and displays the image AR1 in the display region V1 (step S84).

The HMD control section 141 detects or acquires a visual recognition state of the indicator 349 included in the mobile machine 310A (step S85). That is, the HMD control section 141 can detect, from the position detected in step S82 and the altitude, the angle, and the like of the mobile machine 310A, a visual recognition state including, for example, whether the user of the HMD 100A can visually recognize the indicator 349. For example, the user can input the visual recognition state by operating the control device 10. In this case, the HMD control section 141 acquires the visual recognition state input by the user.

The HMD control section 141 adjusts, according to the visual recognition state detected or acquired in step S85, a display state of the image AR1 started to be displayed in step S84 (step S86). For example, when the user can satisfactorily visually recognize the indicator 349, the HMD control section 141 reduces the display luminance of the image AR1 or stops the display. When it is difficult for the user to visually recognize the indicator 349, the HMD control section 141 improves the display luminance of the image AR1.

As explained above, the mobile machine composite control system 1 in the embodiment applied with the invention is the display system including the HMD 100 functioning as the first display device and the HMD 100 functioning as the second display device. The HMD 100 functioning as the first display device includes the image display section 20 and the operation detecting section 157 that detects operation. The HMD 100 functioning as the first display device includes the command generating section 159 that generates, according to the operation detected by the operation detecting section 157, a command for operating the mobile machine 310 functioning as the first mobile body. The HMD 100 functioning as the first display device includes the image-data acquiring section 154 that acquires captured image data concerning a captured image captured by the mobile machine 310 functioning as the first mobile body. The HMD 100 functioning as the first display device includes the display control section 147 that causes the image display section 20 to display an image based on the captured image data acquired by the image-data acquiring section 154. The HMD 100 functioning as the second display device includes the image display section 20 and the image-data acquiring section 154 that acquires captured image data concerning a captured image captured by the mobile machine 310 functioning as the first mobile body. The HMD 100 functioning as the second display device includes the display control section 147 that causes the image display section 20 to display an image based on the captured image data acquired by the image-data acquiring section 154.

With the mobile machine composite control system 1, the HMD 100, and the control method for the HMD 100 applied with the invention, the HMD 100 generates a command for operating the mobile machine 310. Consequently, the HMD 100 that displays an image concerning a captured image captured by the mobile machine 310 can be used for operation of the mobile machine 310. Therefore, it is possible to perform the operation of the mobile machine 310 while viewing an image displayed by the display device. Since it is possible to display, with the HMD 100 functioning as the second display device, the image concerning the captured image captured by the mobile machine 310, for example, a person not involved in the operation of the mobile machine 310 can confirm the captured image of the mobile machine 310. For example, when the user wearing the HMD 100A pilots the mobile machine 310A, in the HMD 100B or the HMD 100C used by a user not piloting the mobile machine 310A, it is possible to display an image based on captured image data of the mobile machine 310A. In this case, it is possible to share the image based on the captured image data of the mobile machine 310A between the HMD 100A and the HMDs 100B and 100C not piloting the mobile machine 310A. Not only the sharing of the image, for example, at timing when the image based on the captured image data of the mobile machine 310A is not displayed in the HMD 100A, the image based on the captured image data of the mobile machine 310A may be displayed by the HMDs 100B and 100C not piloting the mobile machine 310A.

The image display section 20 displays an image to enable visual recognition of an outside scene by transmitting external light. The display control section 147 controls the visibility of the outside scene in the image display section 20. Therefore, the HMD 100 functioning as the first display device displays, on the image display section 20 that enables the visual recognition of the outside scene, the image concerning the captured image captured by the mobile machine 310. Consequently, it is possible to visually recognize the mobile machine 310 in the real space, perform operation concerning the motion of the mobile machine 310, and visually recognize the image concerning the captured image. Therefore, it is possible to confirm the captured image and perform the operation of the mobile machine 310 while viewing the mobile machine 310 in the real space. Since the visibility of the outside scene in the image display section 20 can be controlled, for example, it is possible to prioritize the visibility of the mobile machine 310 in the real space over the visibility of the captured image and control the display to facilitate the operation of the mobile machine 310.

The display control section 147 causes the image display section 20 to display an operation screen concerning processing for generating a command and controls the visibility of the outside scene in the image display section 20 according to a display state of the operation screen. Consequently, since it is possible to control the visibility of the outside scene according to the display state of the operation screen, for example, it is possible to adjust the visibility of the operation screen and the visibility of the mobile machine 310 in the real space. Therefore, it is possible to improve easiness of the operation of the mobile machine 310.

The display control section 147 controls the visibility of the outside scene in the image display section 20 according to a display state of an image based on captured image data. Consequently, since the visibility of the outside scene is controlled according to a display state concerning a captured image of the mobile machine 310, for example, it is possible to adjust the visibility of the mobile machine 310 in the real space and the visibility of the image concerning the captured image. It is possible to achieve further improvement of the convenience.

The HMD control section 141 of the HMD 100 may control the visibility of the outside scene in the image display section 20 on the basis of a state of the image display section 20 or the user who uses the image display section 20. This operation can be applied in all of the HMDs 100A, 100B, and 100C functioning as the first display device and the HMDs 100A, 100B, and 100C functioning as the second display device. Therefore, it is possible to control the visibility of the outside scene according to importance of the visibility of the outside scene for the user reflected on the position, the movement, the posture, and the like of the image display section 20 or the user.

The display control section 147 causes the image display section 20 to display an image corresponding to an operation state of the mobile machine 310. Consequently, it is possible to obtain information concerning the operation state of the mobile machine 310 according to the display of the image display section 20. It is possible to achieve improvement of convenience concerning the operation of the mobile machine 310 and use of a captured image of the mobile machine 310.

In the HMD 100 functioning as the second display device, the image display section 20 displays an image to enable visual recognition of an outside scene by transmitting external light. The display control section 147 controls the visibility of the outside scene in the image display section 20. Consequently, in the HMD 100 functioning as the second display device, it is possible to visually recognize the outside scene and an image concerning a captured image captured by the mobile machine 310. It is possible to control the visibility of the outside scene.

The HMD 100 functioning as the second display device includes the operation detecting section 157 that detects operation and the command generating section 159 that generates, according to the operation detected by the operation detecting section 157, a command for operating the mobile machine 310. The display control section 147 causes the image display section 20 to display an operation screen concerning processing for generating a command and controls the visibility of the outside scene in the image display section 20 according to a display state of the control screen. In this configuration, the HMD 100 functioning as the first display device generates a command concerning the operation of the mobile machine 310 and the HMD 100 functioning as the second display device generates a command concerning the operation of the mobile machine 310. Therefore, the user who uses the HMD 100 functioning as the first display device and the user who uses the HMD 100 functioning as the second display device can respectively perform operation concerning the motion of the mobile machine 310 while visually recognizing the mobile machine 310 in the real space. Further, it is possible to visually recognize an image concerning a captured image captured by the mobile machine 310. Consequently, it is possible to provide the mobile machine composite control system 1 capable of easily performing the operation of the plurality of mobile machines 310A, 310B, and 310C and use of captured images captured by the mobile machines 310A, 310B, and 310C.

The image-data acquiring section 154 included in the HMD 100 functioning as the second display device acquires image data of the mobile machine 310 concerning a captured image captured by the mobile machine 310. The display control section 147 displays, on the image display section 20, an image based on captured image data acquired by the image-data acquiring section 154 and the image based on the image data of the mobile machine 310. Consequently, it is possible to display, with the HMD 100 functioning as the second display device, images concerning captured images respectively captured by the mobile machines 310.

The display control section 147 controls the visibility of the outside scene in the image display section 20 according to a display state of at least any one of the image based on the captured image data acquired by the image-data acquiring section 154 and the image based on the image data of the mobile machine 310. Consequently, it is possible to control the visibility of the outside scene in the case in which a captured image of at least any one of the mobile machines 310A, 310B, and 310C is displayed. Therefore, it is possible to adjust a balance of the visibilities of the outside scene and the captured images of the mobile machines 310A, 310B, and 310C. For example, when the user of the HMD 100 functioning as the second display device operates (pilots) the HMD 100, it is possible to prioritize the visibility of the mobile machine 310 in the real space and improve operability.

The display control section 147 causes the image display section 20 to display an image corresponding to an operation state of the mobile machine 310. Consequently, it is possible to perform display concerning the operation state of the mobile machine 310 in the HMD 100 functioning as the second display device. It is possible to further facilitate the operation concerning the motion of the mobile machine 310 and improve the operability.

The display control section 147 causes the image display section 20 to display images corresponding to operation states of the mobile machines 310. Consequently, it is possible to perform the display concerning the operation states of the mobile machines 310 in the HMD 100 functioning as the second display device. Consequently, it is possible to perform operation concerning the motion of the mobile machine 310 while confirming a state of the mobile machine 310.

The display control section 147 causes the image display section 20 to display an image corresponding to an operation state of the mobile machine 310 in a position corresponding to the mobile machine 310 visually recognized in the outside scene via the image display section 20. Consequently, it is possible to cause the image display section 20 to display, according to a position where the mobile machine 310 in the real space is visually recognized, an image displayed by the image display section 20 concerning the operation state of the mobile machine 310. It is possible to obtain information concerning the operation state of the mobile machine 310 while viewing the mobile machine 310 in the real space. Therefore, it is possible to further facilitate the operation concerning the motion of the mobile machine 310 and improve the operability.

The HMD 100 acquires, with the position-information acquiring section 156, information concerning the position of at least any one of the mobile machines 310A, 310B, and 310C. The display control section 147 causes the image display section 20 to display the information acquired by the position-information acquiring section 156. Consequently, it is possible to perform display concerning the positions of the mobile machines 310A, 310B, and 310C in the HMD 100.

The command generating section 159 generates, on the basis of the position information of the mobile machine 310 acquired by the position-information acquiring section 156, a command for operating the mobile machine 310. Consequently, it is possible to operate the mobile machine 310 according to the position of the mobile machine 310.

The image display section 20 is a head-mounted display section mounted on the head of the user. Consequently, with the display device including the head-mounted display section, it is possible to perform operation concerning the motion of the mobile machine 310 while visually recognizing the mobile machine 310 in the real space and further view an image concerning a captured image captured by the mobile machine 310.

The information concerning the position of the mobile machine 310 may include the mobile machine position information explained above and may include, besides the mobile machine position information, mobile machine state information concerning an environment and a state of the mobile machine 310. The mobile machine state information may include information related to the position of the mobile machine 310. For example, the mobile machine state information may include information concerning a peripheral facility such as a facility name or a building name in the vicinity of or immediately below the mobile machine 310. The mobile machine state information may include information concerning the environment (weather, temperature, humidity, wind velocity, wind direction, precipitation, etc.) of the mobile machine 310.

Note that the invention is not limited to the configuration of the embodiment explained above and can be carried out in various forms without departing from the spirit of the invention.

For example, the mobile machine camera 335 of the mobile machine 310 is not limited to a camera that performs imaging with visible light and may be a component that performs imaging with invisible light such as infrared light or a sensor that uses ultrasound or the like. For example, a light source that irradiates infrared light may be mounted on the mobile machine 310. Consequently, it is possible to detect sugar contents of agricultural products using the captured image data of the mobile machine 310. When a construction is inspected, for example, it is possible to perform flaw examination of the target construction and perform measurement of temperature using a thermography technique.

As still another application example of the mobile machine composite control system 1, there is a use in which, in a large facility including a large number of seats such as a stadium, a congestion degree in each place is determined using the captured image data of the mobile machine 310 or a state of congestion in a road is determined using the captured image data of the mobile machine 310.

In the embodiment explained above, the operation detecting section 157 is capable of detecting the movement of the image display section 20 or the operation on the image display section 20 and generating, according to the operation, a command generated by the command generating section 159 for instructing the routine operation. The operation detecting section 157 may detect operation by a device other than the HMD 100. For example, the user uses an operation device of a finger ring type worn on a finger. For example, the user uses an operation device of a wristwatch type worn on an arm. Each of the operation devices may include the movement sensors such as the six-axis sensor 235 and the magnetic sensor 237 and a transmitting section that transmits detection values of the movement sensors to the HMD 100. In this case, if the operation device and the HMD communication section 117 are capable of communicating with each other through the Bluetooth, the operation detecting section 157 can detect operation for moving the operation device. In this case, when the movement of the operation device is a preset form, the operation detecting section 157 may generate a command for instructing the routine operation.

The operation detecting section 157 may detect a command instruction by voice collected by the microphone 63. That is, when a pattern of voice detected by the sound interface 182 corresponds to a preset pattern, the detection control section 151 may generate a command for instructing the routine operation.

Like the pointer H shown in the figures, besides a finger, a hand, and the like of a human, a pointer may be a remote control device that remotely operates the HMD 100, a pointing stick, a pen, or the like. The detection control section 151 may detect operation of a device such as an air mouse. As detecting means, a captured image of the HMD camera 61 can be used. A device including a light emitting body such as an LED can also be used as the pointer.

For example, in the embodiment, the configuration is illustrated in which the control device 10 is connected to the image display section 20 by wire. However, the invention is not limited to this. A configuration may be adopted in which the image display section 20 is connected to the control device 10 by radio. As a wireless communication scheme in this case, a scheme illustrated as a communication scheme to which the HMD communication section 117 is adapted may be adopted. Other communication schemes may be adopted.

A part of the functions of the control device 10 may be provided in the image display section 20. The control device 10 may be realized by a plurality of devices. For example, instead of the control device 10, a wearable device attachable to the body or clothes of the user or an ornament worn by the user may be used. The wearable device in this case may be, for example, a watch-type device, a finger ring-type device, a laser pointer, a mouse, an air mouse, a game controller, or a pen-type device.

Further, in the embodiment, the configuration is illustrated in which the image display section 20 and the control device 10 are separated and connected via the connection cable 40. The invention is not limited to this. A configuration may be adopted in which the control device 10 and the image display section 20 are integrated and worn on the head of the user.

In the embodiment, the configuration in which the user visually recognizes the outside scene through the display section is not limited to the configuration in which the right light guide plate 26 and the left light guide plate 28 transmit the external light. For example, the invention can also be applied to a display device that displays an image in a state in which the outside scene cannot be visually recognized. Specifically, the invention can be applied to a display device that displays, for example, a captured image of the HMD camera 61, an image and a CG generated on the basis of the captured image, and a video based on video data stored in advance and video data input from the outside. The display device of this type can include a display device of a so-called closed type that cannot visually recognize the outside scene. For example, if a configuration is adopted in which a combined image obtained by combining an image of an outside scene imaged by the HMD camera 61 and a displayed image is displayed by the image display section 20, even if the image display section 20 does not transmit the external light, it is possible to visually recognizably display the outside scene and the image to the user. The invention can be naturally applied to such a display device of a so-called video see-through type.

In the embodiment, as an example of the mobile body, the mobile machine 310, which is the unmanned aerial vehicle and the quadricopter, is explained. The mobile body is not limited to this. The mobile body can also be applied to various unmanned mobile bodies, which are remotely operated and automatically driven, such as an automobile, a ship, a robot, and toys of the automobile, the ship, and the robot. The mobile body in this case only has to include a camera that captures an image. Examples of the mobile body include mobile bodies such as a helicopter, an airplane, a rocket, a submarine, an artificial satellite, a vehicle such as a bus, and a railroad vehicle. The mobile body may be manned or unmanned and may be loaded with a cargo. The mobile body may be an apparatus piloted and operated in an unmanned state and may be configured to transport people. The mobile body may be an additional apparatus such as a crane unit incidental to a truck (an automobile for cargo transportation). The mobile body can be applied to apparatuses used in the agriculture, the forestry, the fishery, the mining industry, and the like such as vehicles for work and apparatuses for work (e.g., for construction sites) such as a power shovel, a snowplow, a lawn mower, a tractor, a bulldozer, a combine harvester, a cultivator, a rice planting machine, a crop-dusting machine. These mobile bodies may be apparatuses remotely operated and used or may be apparatuses that a person rides and operates.

The invention can also be applied to a display device that does not perform processing such as the AR display for displaying an image to be superimposed on the real space as explained in the embodiment, MR (Mixed Reality) display for combining a captured image in the real space and a virtual image, or VR (Virtual Reality) display for displaying a virtual image. For example, a display device that displays video data or an analog video signal input from the outside is naturally included as an application target of the invention.

For example, instead of the image display section 20, an image display section of another system such as an image display system worn like a cap may be adopted. The image display section only has to include a display section that displays an image corresponding to the left eye LE of the user and a display section that displays an image corresponding to the right eye RE of the user. The display device according to the invention may be configured as a head mounted display mounted on a vehicle such as an automobile or a plane. For example, the display device may be configured as a head mounted display incorporated in a body protector such as a helmet. In this case, a portion for positioning a position with respect to the body of a user and a portion positioned with respect to the portion can be set as wearing sections.

In the embodiment, the configuration in which a virtual image is formed by the half mirrors 261 and 281 in a part of the right light guide plate 26 and the left light guide plate 28 is illustrated as the optical system that guides image light to the eyes of the user. The invention is not limited to this. A configuration may be adopted in which an image is displayed in a display region having an area occupying the entire or most of the right light guide plate 26 and the left light guide plate 28. In this case, processing for reducing the image may be included in operation for changing a display position of the image.

Further, the optical elements according to the invention are not limited to the right light guide plate 26 and the left light guide plate 28 including the half mirrors 261 and 281 and only have to be optical components that make image light incident on the eyes of the user. Specifically, a diffraction grating, a prism, and a holography display section may be used.

At least a part of the functional blocks shown in FIGS. 2, 7, 8, and the like may be realized by hardware or may be realized by cooperation of hardware and software and are not limited to the configuration in which the independent hardware resources are disposed as shown in the figures. The computer programs to be executed by the HMD control section 141 may be stored in the nonvolatile storing section 121 or other storage devices (not shown in the figure) in the control device 10. The HMD control section 141 may acquire computer programs stored in an external device via the HMD communication section 117 and the external connector 184 and execute the computer programs. Among the components formed in the control device 10, the operation section 110 may be formed as a user interface (UI). The components formed in the control device 10 may be redundantly formed in the image display section 20. For example, a processor similar to the main processor 140 may be disposed in the image display section 20. The main processor 140 included in the control device 10 and the processor of the image display section 20 may execute separately divided functions.

The entire disclosure of Japanese Patent Application No. 2017-034319, filed Feb. 27, 2017 is expressly incorporated by reference herein.

What is claimed is:
1. A display system comprising a first display device and a second display device, wherein
   the first display device includes:
   a first display section;
   a first operation detecting section configured to detect operation;

a first mobile-body control section configured to generate, according to the operation detected by the first operation detecting section, a command for operating a first mobile body;

a first mobile-body-image-data acquiring section configured to acquire first mobile body image data concerning a captured image captured by the first mobile body; and a first display control section configured to cause the first display section to display an image based on the first mobile body image data acquired by the first mobile-body-image-data acquiring section, and the second display device includes:

a second display section;

a second mobile-body-image-data acquiring section configured to acquire the first mobile body image data concerning the captured image captured by the first mobile body; and a second display control section configured to cause the second display section to display an image based on the first mobile body image data acquired by the second mobile-body-image-data acquiring section.

2. The display system according to claim 1, wherein the first display section displays the image to enable visual recognition of an outside scene by transmitting external light, and the first display control section controls visibility of the outside scene in the first display section.

3. The display system according to claim 2, wherein the first display control section causes the display section to display a screen for operation concerning processing for generating the command and controls the visibility of the outside scene in the first display section according to a display state of the screen for operation.

4. The display system according to claim 2, wherein the first display control section controls the visibility of the outside scene in the first display section according to a display state of the image based on the first mobile body image data.

5. The display system according to claim 4, wherein the first display control section controls the visibility of the outside scene in the first display section on the basis of a state of the first display section or a user who uses the first display section.

6. The display system according to claim 1, wherein the first display control section causes the first display section to display an image corresponding to an operation state of the first mobile body.

7. The display system according to claim 1, wherein the second display section displays the image to enable visual recognition of an outside scene by transmitting external light, and the second display control section controls visibility of the outside scene in the second display section.

8. The display system according to claim 7, wherein the second display control section controls the visibility of the outside scene in the second display section on the basis of a state of the second display section or a user who uses the second display section.

9. The display system according to claim 7, wherein the second display device further includes:

a second operation detecting section configured to detect operation; and a second mobile-body control section configured to generate, according to the operation detected by the second operation detecting section, a command for operating a second mobile body, and the second display control section causes the display section to display a screen for operation concerning processing for generating the command and controls the visibility of the outside scene in the second display section according to a display state of the screen for operation.

10. The display system according to claim 9, wherein the second mobile-body-image-data acquiring section included in the second display device acquires second mobile body image data concerning a captured image captured by the second mobile body, and the second display control section displays, on the second display section, an image based on the first mobile body image data acquired by the second mobile-body-image-data acquiring section and an image based on the second mobile body image data acquired by the second mobile-body-image-data acquiring section.

11. The display system according to claim 10, wherein the second display control section controls the visibility of the outside scene in the second display section according to a display state of at least one of the image based on the first mobile body image data acquired by the second mobile-body-image-data acquiring section and the image based on the second mobile body image data acquired by the second mobile-body-image-data acquiring section.

12. The display system according to claim 9, wherein the second display control section causes the second display section to display an image corresponding to an operation state of the second mobile body.

13. The display system according to claim 9, wherein the second display control section causes the second display section to display images corresponding to an operation state of the first mobile body and an operation state of the second mobile body.

14. The display system according to claim 9, wherein the second display control section causes the second display section to display an image corresponding to an operation state of the second mobile body in a position corresponding to the second mobile body visually recognized in the outside scene via the second display section.

15. The display system according to claim 9, wherein the second display device further includes a position-information acquiring section configured to acquire information concerning a position of the first mobile body and a position of the second mobile body, and the second display control section causes the second display section to display the information acquired by the position-information acquiring section.

16. The display system according to claim 9, wherein the second mobile-body control section included in the second display device generates, on the basis of the information acquired by the position-information acquiring section, the command for operating the second mobile body.

17. The display system according to claim 9, wherein the second mobile-body control section included in the second display device generates, on the basis of the information acquired by the position-information acquiring section, the command for operating the first mobile body.

18. The display system according to claim 1, wherein at least one of the first display section and the second display section is a head-mounted display section mounted on a head of a user.

* * * * *